(12) United States Patent
Kunz et al.

(10) Patent No.: US 6,317,876 B1
(45) Date of Patent: Nov. 13, 2001

(54) METHOD AND APPARATUS FOR DETERMINING A MAXIMUM NUMBER OF LIVE REGISTERS

(75) Inventors: Robert C. Kunz, Palo Alto; Peter J. Dahl, Cupertino, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/328,043

(22) Filed: Jun. 8, 1999

(51) Int. Cl.⁷ .................................................. G06F 9/44
(52) U.S. Cl. ................................................ 717/9; 717/5
(58) Field of Search ................................................ 717/9, 5

(56) References Cited

U.S. PATENT DOCUMENTS

| | | | | |
|---|---|---|---|---|
| 5,249,295 | * | 9/1993 | Briggs et al. | 717/9 |
| 5,367,651 | * | 11/1994 | Smith et al. | 717/9 |
| 5,367,684 | * | 11/1994 | Smith | 717/9 |
| 5,946,491 | * | 8/1999 | Aizikowitz et al. | 717/9 |
| 6,090,156 | * | 7/2000 | MacLeod | 717/9 |
| 6,128,775 | * | 10/2000 | Chow et al. | 717/9 |

FOREIGN PATENT DOCUMENTS

| | | | | |
|---|---|---|---|---|
| 5249295 | * | 9/1993 | (EP) | 717/9 |
| 404241630 | * | 8/1992 | (JP) | 717/9 |

OTHER PUBLICATIONS

"Advanced Compiler Design & Implementation", Steven S. Munchnick et al. Aug. 19, 1997, pp. 482–530.*
"Register Allocation", IBM Technical Bulletin, Mar. 1986, vol. 28, Issue 10 pp. 4506–4513.*

* cited by examiner

*Primary Examiner*—Mark R. Powell
*Assistant Examiner*—Todd Ingberg

(57) ABSTRACT

The present invention is a method and apparatus for compiler optimization that determines the maximum number of live computer registers, or pressure point. The present invention improves the productivity of a software developer by reducing compilation time of a computer program. More particularly, the overhead required during compilation to search information to determine the maximum number of live registers is reduced. The present invention records the relevant events related to the execution of a computer program, as opposed to a comprehensive history of the read instructions and write instructions. Also, the present invention maintains information about the maximum number of live registers for any partition related to the execution of a computer program. The present invention may bound the required system resources required to determine the maximum number of live registers to the number of registers associated with the number of partitions.

20 Claims, 11 Drawing Sheets

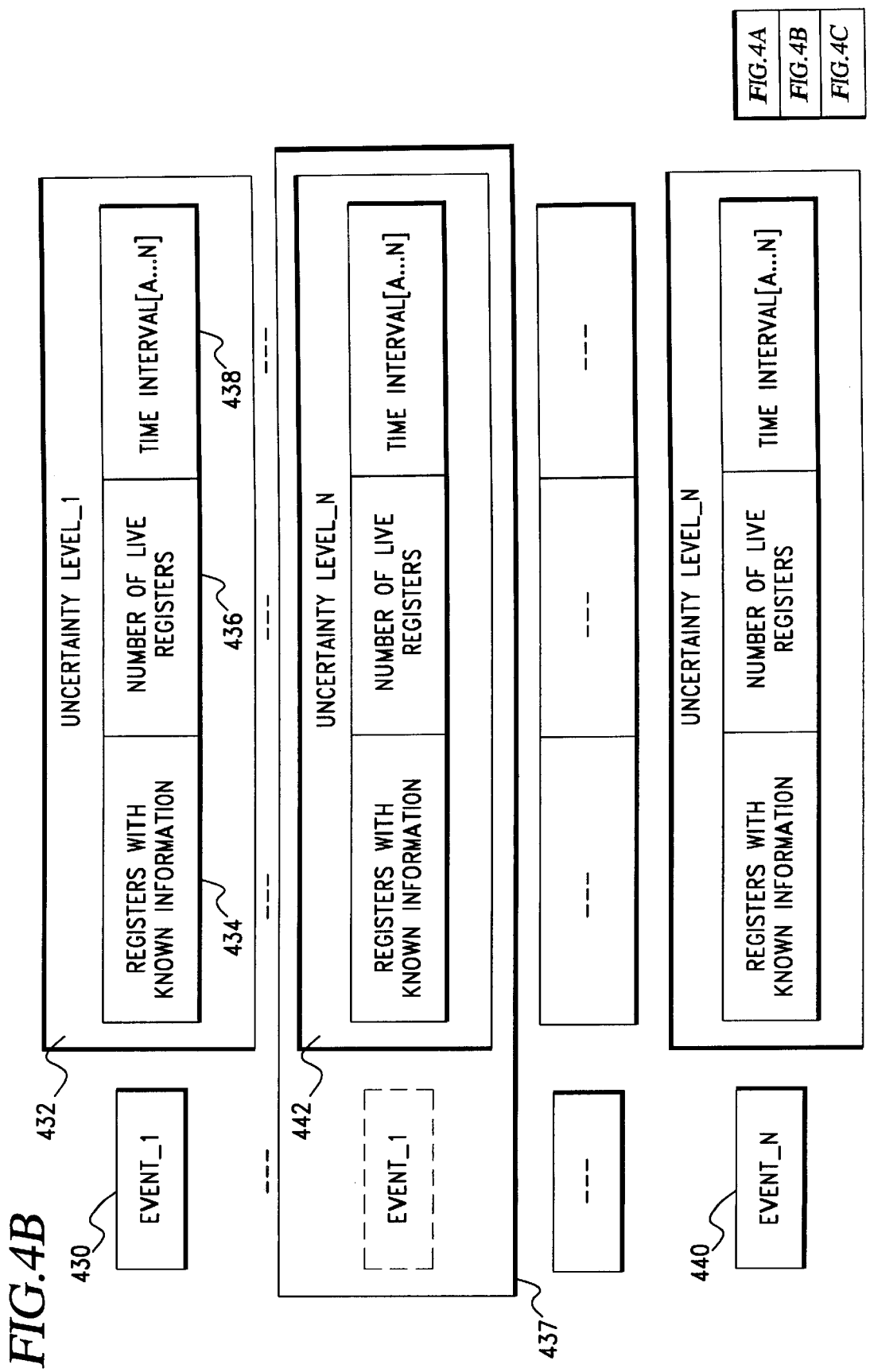

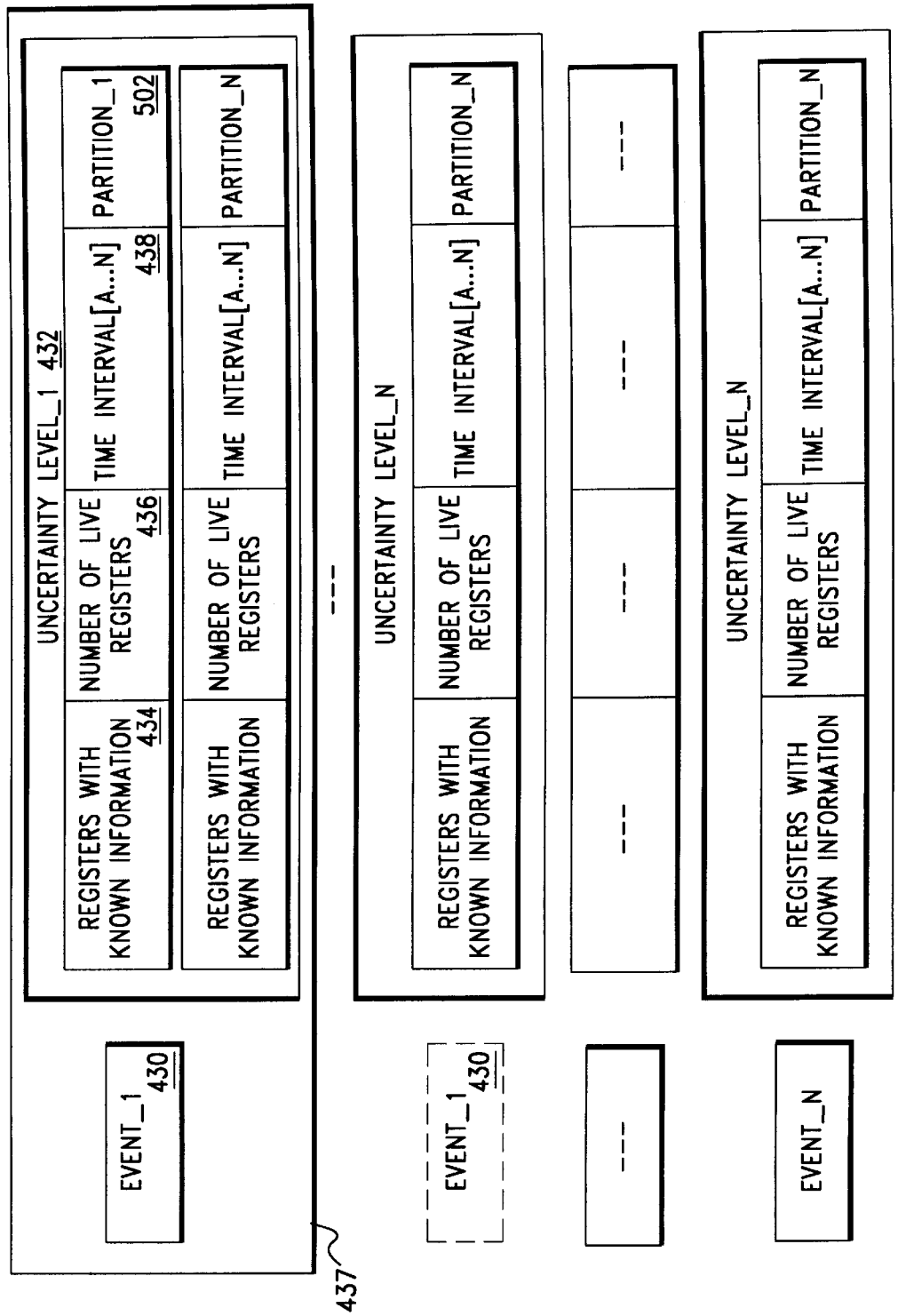

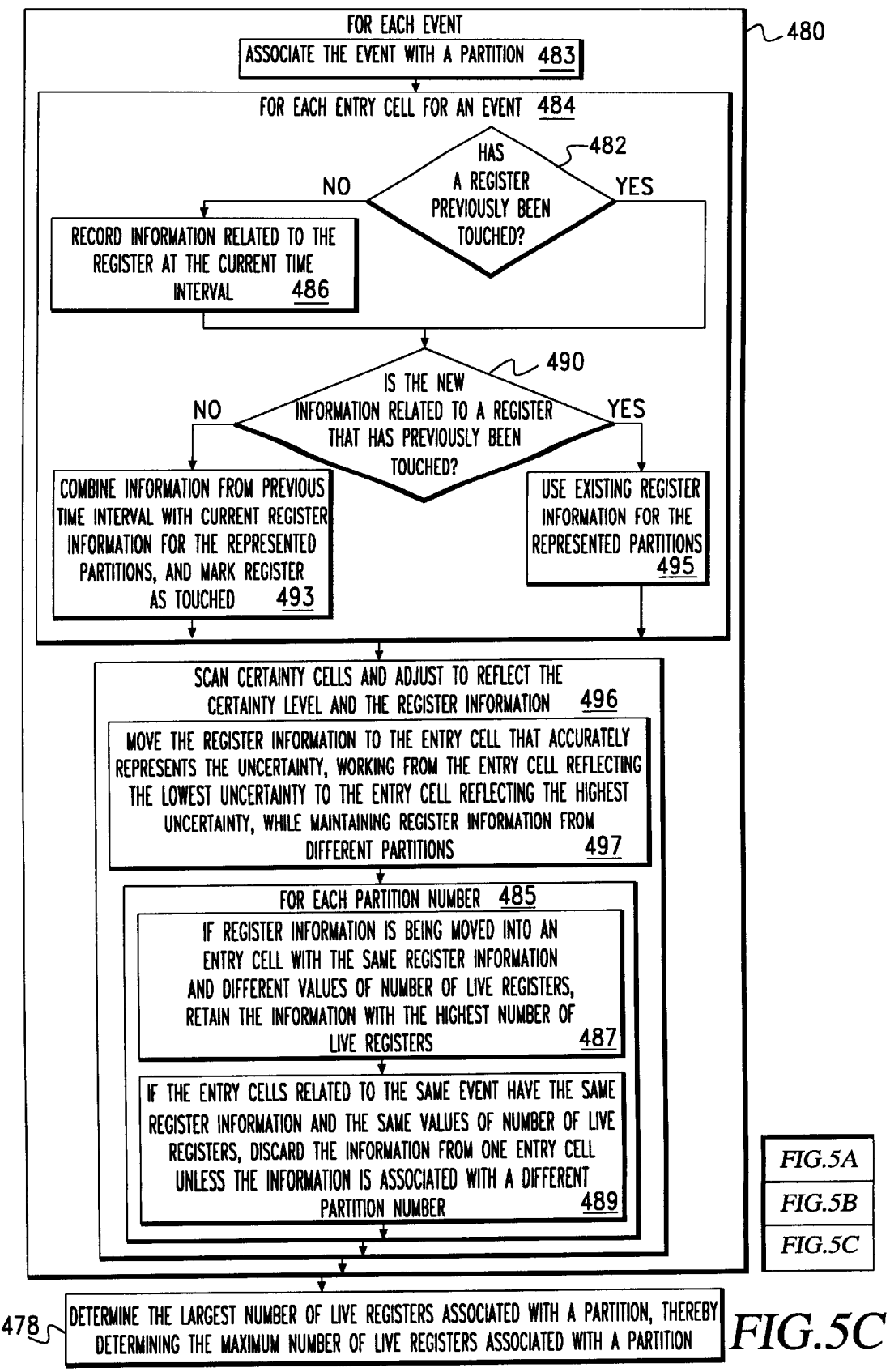

METHOD AND APPARATUS FOR DETERMINING A MAXIMUM NUMBER OF LIVE REGISTERS

FIELD OF THE INVENTION

The present invention relates generally to a method and apparatus for optimizing compilers by determining the maximum number of live registers used during the execution of a computer program.

BACKGROUND OF THE INVENTION

Almost all microprocessors have a load-store architecture in which values are loaded from memory into registers, operations are performed on values loaded in the registers, and the resulting values are again stored into memory. Register allocation, which is typically a function of compilation systems, determines the values that may access the registers of a computer system during any point in the execution of a program. Accordingly, register allocation is an important technique of compiler optimization because the number of computer registers is limited and because register operations are performed faster than memory loads and stores. Register allocation is discussed with reference to *Advanced Compiler Design and Implementation*, Steven S. Muchnick, 1997.

Some methods for optimizing register allocation limit the allocation of values to computer registers, to periods when an instruction associated with the value is live. It will be appreciated that a code instruction may be associated with a value, and the value is referred to as "live" during the time period in which the value may be executed. Also, the register accessed by the value is termed a "live register" during the period that the value is live. The range of code instructions in which the value is live is referred to as a live range of the value. While a value is live it is desirable to allocate a register to the value to enable instruction processing to continue without storing the value in memory, and the allocated register may be referred to as a live register. Values may reside in virtual registers and virtual registers may represent hardware registers. As used herein the phrase computer registers, represents those registers that are visible to the software developer.

Prior register allocation solutions included recording a history of read instructions and write instructions and searching the recorded events to find the maximum number of live registers, sometimes referred to as the maximum pressure point, at a particular point in the execution of the program. Therefore, the comprehensive read instruction and write instruction history related to the execution of a program must be stored, and that results in a large amount of time required for compiler optimization. It will be appreciated by those skilled in the art, that compiler optimization uses the value of the maximum number of live registers to efficiently manager register allocation.

Since the number of samples to be searched is large, the associated large amount of computing resources and searching time has inhibited improvements in compiler optimization. As known to those skilled in the art, compiler optimization solutions that increase the computer overhead necessary for compilation, reduce the usefulness of the optimization solution and reduce the productivity of software development engineers. This reduction in productivity and increase in computer system requirements has limited further improvement of software development techniques.

SUMMARY OF THE INVENTION

The present invention is a method and apparatus for determining the maximum number of live computer registers, or pressure point. Software developers typically follow a work cycle of development, debugging, and testing of code. The productivity of a software developer can be improved by reducing the time spent in any part of the development cycle. Development and debugging productivity primarily depends on compilation time. Therefore it is important to continue to create compiler optimization tools that improve the compilation process.

Accordingly it is an object of the invention to record the relevant events related to the execution of a computer program, as opposed to a comprehensive history of the read instructions and write instructions. That is, during the operation of the present embodiment events that do not affect the maximum number of live registers are not recorded.

It is also an object of the invention to maintain information about the maximum number of live registers for any partition related to the execution of a computer program. It will be understood that a partition may identify sub-sets of information related to the operation of the present invention.

It is also an object of the invention to reduce the overhead required to search the information related to execution of a computer program to determine the maximum number of live registers. Further, the present invention may bound the required system resources required to determine the maximum number of live registers to the number of registers associated with the number of partitions.

Accordingly, it is an object of the invention to improve software developer productivity by reducing the overhead required to search the information about execution to determine the maximum number of live registers.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings are incorporated in and constitute a part of this specification and, together with the description, explain the advantages and principles of the invention. In the drawings.

FIG. 4B is a block diagram that illustrates the information that the register pressure tool maintains and manages;

FIG. 5B is a block diagram that illustrates the information that the register pressure tool maintains and manages when the information is partitioned; and FIG. 5C is a flow diagram of the operation of the register pressure tool when the information is partitioned.

DETAILED DESCRIPTION

Figure 1A:
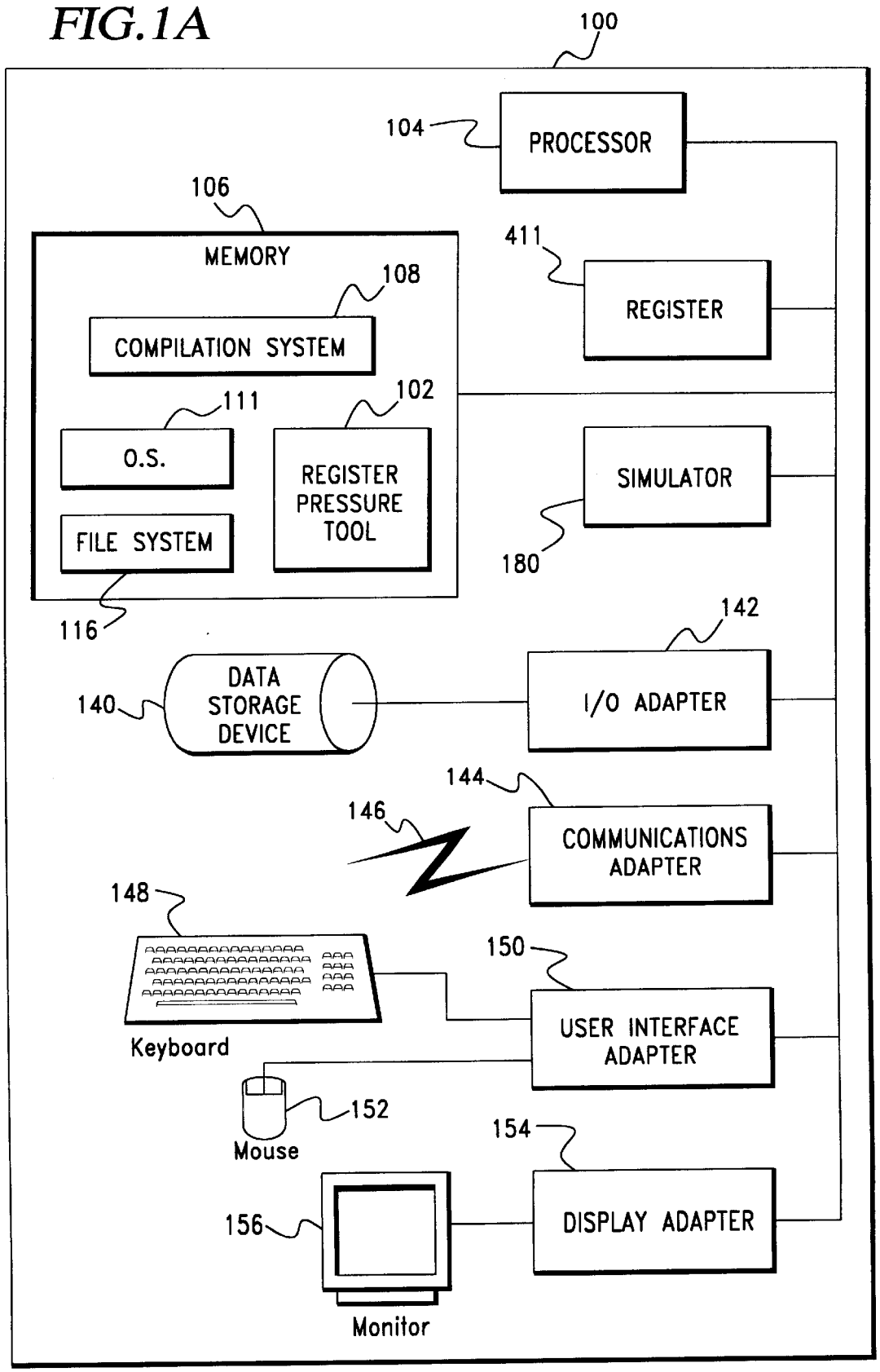
FIG. 1A is a block diagram that illustrates a register pressure tool that operates in a computer system.

In the following detailed description and in the several figures of the drawings, like elements are identified with like reference numerals.

Broadly stated, FIG. 1A illustrates a register pressure tool 102 that operates in a computer system 100 and that determines the number of live registers related to the execution of a computer program thereby improving the efficiency of register allocation during compiler optimization.

Figure 2:
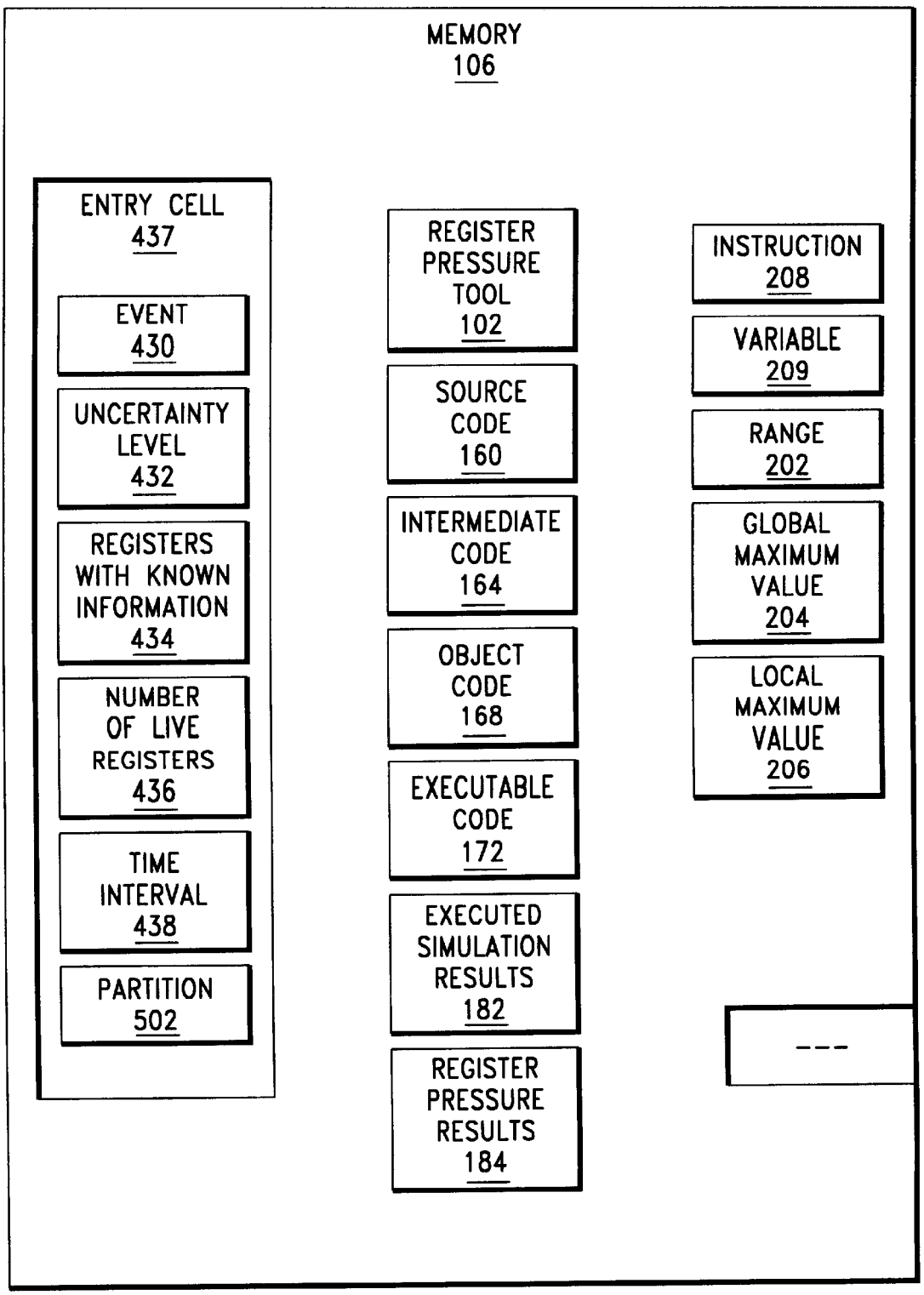
FIG. 2 is a block diagram that illustrates data structures and functions used by the register pressure tool that may be stored in the memory.

The register pressure tool 102 includes instructions 208 (as shown in FIG. 2) and data that may be referred to as values such as integer, real, or complex numbers; or characters. Alternately, the values may be pointers that reference values. Therefore, a pointer provides direction to locate a referenced value.

More particularly, the instructions 208 may be operating instructions of the computer system 100, such as addresses. The addresses may be computer addresses or virtual, symbolic addresses that refer to computer addresses. For instance, a computer address may be a computer hardware register 411 or a location in the memory 106. Software instructions 208 may also include variables 209 (as shown in FIG. 2) that are identifiers for values. That is, the variables 209 may identify storage for values.

FIG. 1A further represents the computer system 100 that includes components such as a processor 104, the memory 106, a data storage device 140, an input/output (I/O) adapter 142, a communications adapter 144, a communications network 146, a user interface adapter 150, a keyboard 148, a mouse 152, a display adapter 154, and a computer monitor 156. It will be understood by those skilled in the relevant art that there are many possible configurations of the components of the computer system 100 and that some components that may typically be included in the computer system 100 are not shown.

It will be understood by those skilled in the art that the functions ascribed to the register pressure tool 102, or any of its functional files, typically are performed by a central processing unit that is embodied in FIG. 1A as the processor 104 executing such software instructions 208.

The processor 104 typically operates in cooperation with other software programs such as the compilation system 108, the operating system (O.S.) 111, and the register pressure tool 102. Henceforth, the fact of such cooperation among the processor 104 and the register pressure tool 102, whether implemented in software, hardware, firmware, or any combination thereof, may therefore not be repeated or further described, but will be implied. The register pressure tool 102 may operate under the control of the O.S. 111.

The computer system 100 may include a simulator 180. The simulator 180 is a model of a computer system 100 and is described in detail with respect to FIG. 1C.

The O.S. 111 may cooperate with a file system 116 that manages the storage and access of files within the computer system 100. Files typically include instructions 208 and data. The interaction between the file system 116 and the O.S. 111 will be appreciated by those skilled in the art.

It will also be understood by those skilled in the relevant art that the functions ascribed to the register pressure tool 102 and its functional files, whether implemented in software, hardware, firmware, or any combination thereof, may in some embodiments be included in the functions of the O.S. 111. That is, the O.S. 111 may include files from the register pressure tool 102. In such embodiments, the functions ascribed to the register pressure tool 102 typically are performed by the processor 104 executing such software instructions 208 in cooperation with aspects of the O.S. 111 that incorporate the register pressure tool 102. Therefore, in such embodiments, cooperation by the register pressure tool 102 with aspects of the O.S. 111 will not be stated, but will be understood to be implied.

Computer memory 106 may be any of a variety of known memory storage devices or future memory devices, including any commonly available random access memory (RAM), cache memory, magnetic medium such as a resident hard disk, or other memory storage devices. In one embodiment the O.S. 111 and the register pressure tool 102 may reside in the memory 106 during execution in the computer system 100.

The compilation system 108 and the O.S. 111 may also reside in the memory 106 when the register pressure tool 102 is operating. Further, the compilation system 108 may operate in cooperation with the O.S. 111 to execute the register pressure tool 102. That is, the present embodiment may employ the compilation system 108 to resolve any system-specific information such as address locations that are necessary to execute the register pressure tool 102 in the computer system 100.

It will be appreciated that "execute" refers to the process of manipulating software or firmware instructions 208 for operation on the computer system 100. The term "code" refers to instructions 208 or data used by the computer system 100 for the purpose of generating instructions 208 or data that execute in the computer system 100. Also, the term "function" may refer to a software "procedure" such as a unit of software that may be independently compiled. A "program" contains software program code, may contain at least one function, and may be independently compiled and executed.

Alternatively programs that operate by an object-oriented design, in which the data associated with an object helps to determine the operation of the object, may cooperate with elements of the compilation system 108 and the register pressure tool 102 to interpret programs for execution in the computer system 100 and thereby to manage allocation of the use of the registers 411. For example the product marketed under the trademark JAVA VIRTUAL MACHINE™ may operate in the computer system 100 on programs created in program code marketed under the trademark JAVA.™ Such JAVA™ programs may cooperate with the register pressure tool 102 and thereby manage allocation of the use of the registers 411.

The register pressure tool 102 may be implemented in the "C" programming language, although it will be understood by those skilled in the relevant art that other programming languages could be used. Also, the register pressure tool 102 may be implemented in any combination of software, hardware, or firmware.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example a keyboard 148, a mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, code may typically be loaded through an input device and may be stored on the data storage device 140. A copy of the code or portions of it, may alternatively be placed by the processor 104 into the memory 106 for execution on the computer system 100.

The computer system 100 may communicate with the network 146 through a communications adapter 144, such as a networking card. The network 146 may be a local area network, a wide area network, or another known computer network or future computer network. It will be appreciated that the I/O device used by the register pressure tool 102 may be connected to the network 146 through the communications adapter 146 and therefore may not be co-located with the computer system 100. It will be further appreciated that other portions of the computer system 100, such as the data storage device 140 and the monitor 156, may be connected to the network 146 through the communications adapter 144 and may not be co-located.

Figure 1B:
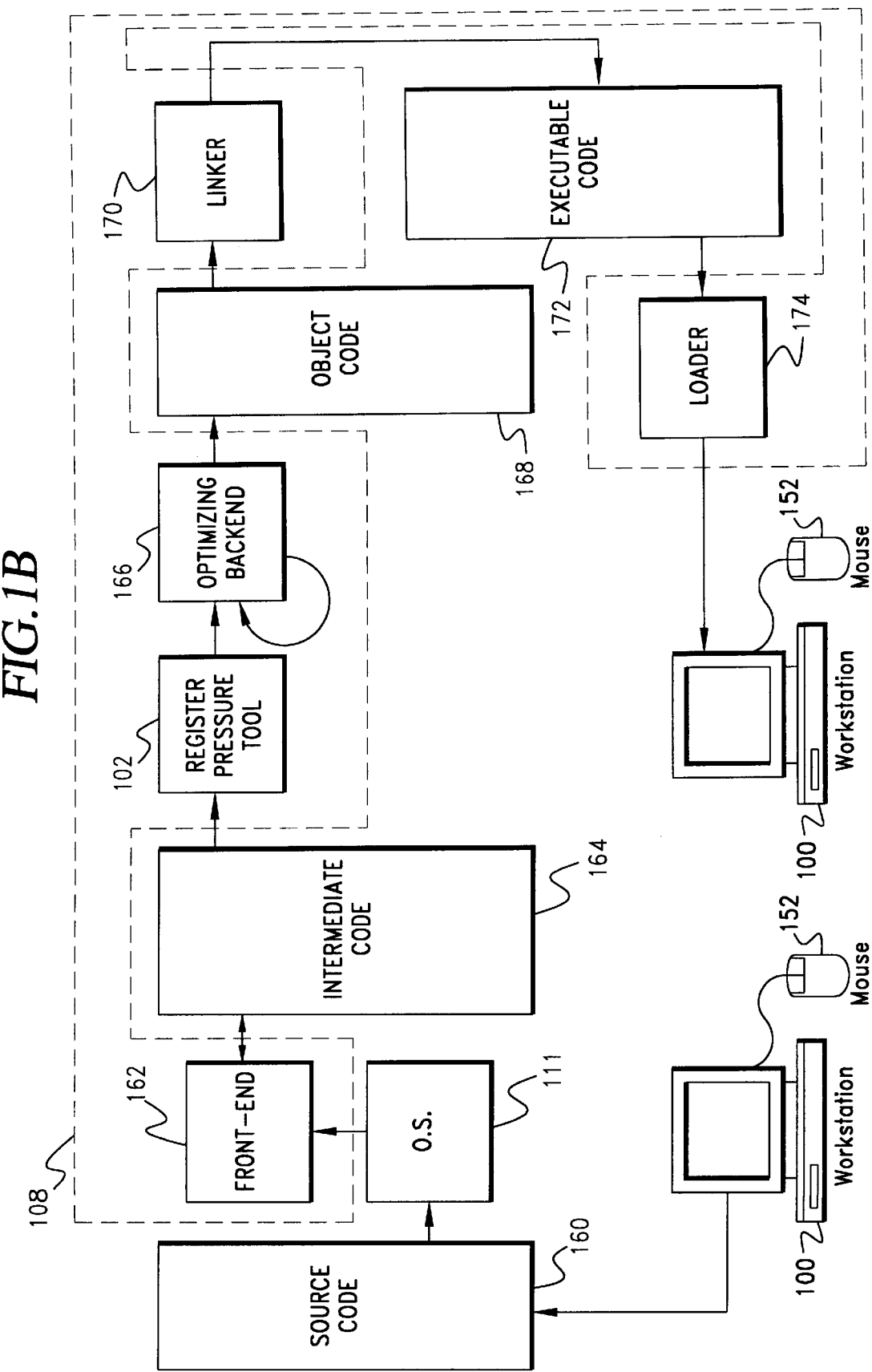
FIG. 1B is a block diagram that illustrates a form of compiler technology including the register pressure tool.

As shown in FIG. 1B the present embodiment is a form of compiler technology that may use software source code 160 that is generated from input computer system 100 I/O devices including a keyboard 148 (as shown in FIG. 1A) and a mouse 152. It will be appreciated that the present embodiment operates on any multi-purpose computer system 100 and is not limited to the illustration herein. A software developer may create source code 160 typically in a high-level programming language such as "C." The computer system 100 may manage the processing of the source code 160 by the O.S. 111 that may direct the processing of the source code 160 by a compiler front-end 162. The compiler front-end 162 may generate intermediate code 164 from the source code 160 and may operate on high-level intermediate code 164. The front-end 162 may optimize code while preserving the structure and sequence of source operations. For instance, the front-end 162 may optimize array contents while retaining the array accesses in the source code 160.

Optimization techniques are utilized by the present embodiment and may generate intermediate code 164 that is processed by an optimizing back-end 166. The intermediate code 164 is a list of intermediate-level language instructions 208 and the maximum register pressure tool 102 may operate on the intermediate code 164. It will be appreciated by those skilled in the art that the techniques such as data flow analysis may be employed to identify relevant information, such as data flow information, that the register pressure tool 102 may access as it operates on the intermediate code 164. By the use of information such as data flow information, the register pressure tool 102 may generate information that determines the maximum register pressure for intermediate code 164 by a specified traversal of the intermediate code 164.

It will be appreciated that the present embodiment may operate with programs that may be dynamically included during program execution. Therefore, whether the program is executing by conventional compiler techniques, by simulation, or by a future execution technology, the present embodiment may operate on code during execution. For example, the present embodiment may operate to determine the register pressure of code that includes dynamically linked libraries. Those skilled in the art will appreciate the use of dynamically linked libraries.

After the maximum register pressure tool 102 has operated on the intermediate code 164, the maximum register pressure tool 102 delivers register pressure information to the optimizing back end 166. If the code semantics can be preserved, the optimizing back-end 166 may move instructions 208 to locations where they are performed less frequently, thereby isolating frequently used instructions 208 for further optimization. The optimizing back-end 166 may generate object code 168 that includes optimization changes which may be dependent on the particular multi-purpose computer system 100 on which the compiler optimizer technology operates. These machine-specific changes may allow the optimizing back-end 166 to generate code that is highly tailored to optimally run on a specific multi-purpose computer system 100; for example code may be tailored to support different cache organizations or a different number of computer processors 104 (as shown in FIG. 1A). Further, the optimizing back-end 166 may execute the intermediate code 164 more than once and thereby may make iterative changes in the intermediate code 164 to enhance further processing by the optimizing back-end 166.

In the present embodiment the linker 170 may operate on the output of the back-end 166 which may be object code 168. In order to execute the object code 168 it may be combined with one or more object code modules to create combined user process executable code 172 by a process known as linking. The present embodiment may employ a linker 170 to resolve any undefined computer location references in the object code 168 and to generate executable code 172 capable of executing on an output multi-purpose computer system 100 with I/O devices such as a keyboard 148 and a mouse 152. It will be appreciated that the input computer system 100 and the output computer system 100 may be the same computer system 100 and are not limited to the configuration illustrated.

In the present embodiment the executable code 172 is formatted to enable a loader 174 to load the executable code 172 into the computer system 100 for execution. The executable code 172 may be any of a variety of known executable files or an executable file of a type to be developed in the future. Examples of such known files are those having an extension of ".exe" operating under a DOS or Windows operating system or an "a.out" file of a UNIX® operating system. It will be appreciated that typically the compilation system 108 may include the front-end 162, the optimizing back-end 164, the linker 170, and the loader 174. The register pressure tool 102 may also be included in the compilation system 108.

Figure 1C:
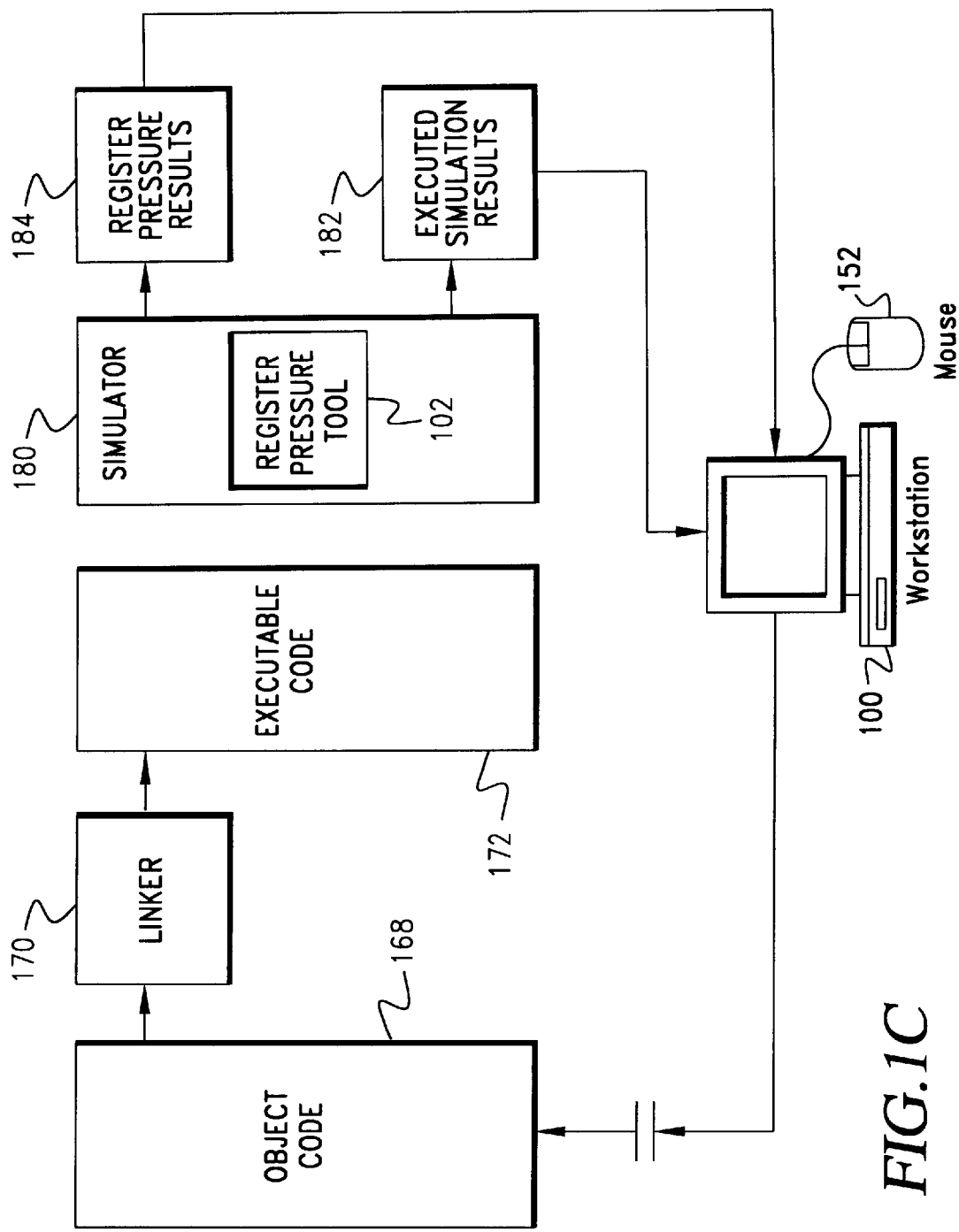
FIG. 1C is a block diagram that illustrates a form of computer simulation including the register pressure tool.

FIG. 1C is a block diagram of a simulation of a computer system 100. The present embodiment may operate on a simulator 180, such as the one illustrated in FIG. 1C. It will be appreciated by those skilled in the art that the simulator 180 may operate in software, firmware, or hardware and is a model of another computer system 100 that may be referred to as a "target."

The computer system 100 may manage the processing of the object code 168 that has been generated by a compilation system 108 such as the one described with reference to FIG. 1B. The linker 170 may generate executable code 172 capable of executing on the computer system 100. The computer system 100 may also direct the processing of the executable code 172 by the simulator 180, thereby executing the executable code 172 by the simulator 180. That is, the simulator 180 may in turn process the executable code 172 and thereby generate executed simulation results 182 that are consistent with the execution results that would occur when the object code 168 is executed directly on the target computer system 100.

In the present embodiment the register pressure tool 102 may be considered an element of the simulator 180. Therefore, as the simulator is operating on the executable code 172 it may generate information that may be used by the register pressure tool 102 to generate register pressure results 184, such as are described in detail with reference to FIG. 4B and FIG. 5B. While the executed simulation results 182 and the register pressure results 184 may represent data structures of a different computer system 100, they may be formatted for use on the same type of computer system 100 that processed the object code 168.

FIG. 2 illustrates data structures and functions used by the register pressure tool 102 that may be stored in the memory 106. The memory 106 may include the following:

a register pressure tool 102 that determines the maximum number of live registers 411 (as shown in FIG. 1A) used during the execution of a computer program;

an entry cell variable 437 that is used in the present embodiment to represent a particular event 430 and the information related to the event 430;

an event 430 that typically operates by accessing registers 411 and executing instructions 208;

an uncertainty level variable 432, that includes information about the number, or quantity, of registers 411 about which information remains unknown;

a registers_with_known_information variable 434, which represents the registers 411 about which information is known regarding whether the range 202 is live or dead;

a number_of_live_registers variable 436, which is a value that represents the number, or quantity, of registers 202 that are live;

a time interval variable 438 that corresponds to the time of an event 430;

a partition variable 502 that identifies sub-sets of the information included in the entry cell 437 and that may reflect specific ranges of time, or specific ranges of events, or a particular section of the code, such as an identified procedure;

source code 160 that is generated from a computer system 100 (as shown in FIG. 1A) and that is typically written in a high-level programming language such as "C;"

intermediate code 164 that is a list of intermediate-level language instructions 208;

object code 168 that includes optimization changes which may be dependent on the particular multi-purpose computer system 100 on which the compilation system 108 (as shown in FIG. 1A) operates;

executable code 172 that is capable of executing on a multi-purpose computer system 100;

executed simulation results 182 that are generated by the simulator 180 (as shown in FIG. 1A);

register pressure results 184 that the register pressure tool 102 generates and that enable management of the register 411 allocation;

instructions 208 that are operating directives of the computer system 100, and that may be manipulated by registers 411, typically instructions 208 may be write instructions 208 or read instructions 208;

variables 209 that are identifiers for values and that may provide storage for values;

a range 202 that includes instructions 208 in which a value is included, and the range 202 is live with respect to the value if the value is live within the range 202, and the range 202 may be associated with a live register 411 that is accessed by the value;

a global maximum value 204 that represents the maximum number_of_live_registers 436 during the execution of the program;

a local maximum value 206 that represents the maximum number_of_live_registers 436, with respect to a partition 502, during the execution of the program;

as well as other data structures and functions.

It will be appreciated by those skilled in the art that events 430 may include a read instruction 208 and a write instruction 208 that access computer registers 411. That is, an event 430 includes register 411 operations such as a load operation that reads information from a register 411 or a store operation that writes information to a register 411. A code range 202 may be live or dead as a function of the type of instruction event 430 accessing a register 411.

Figure 3:
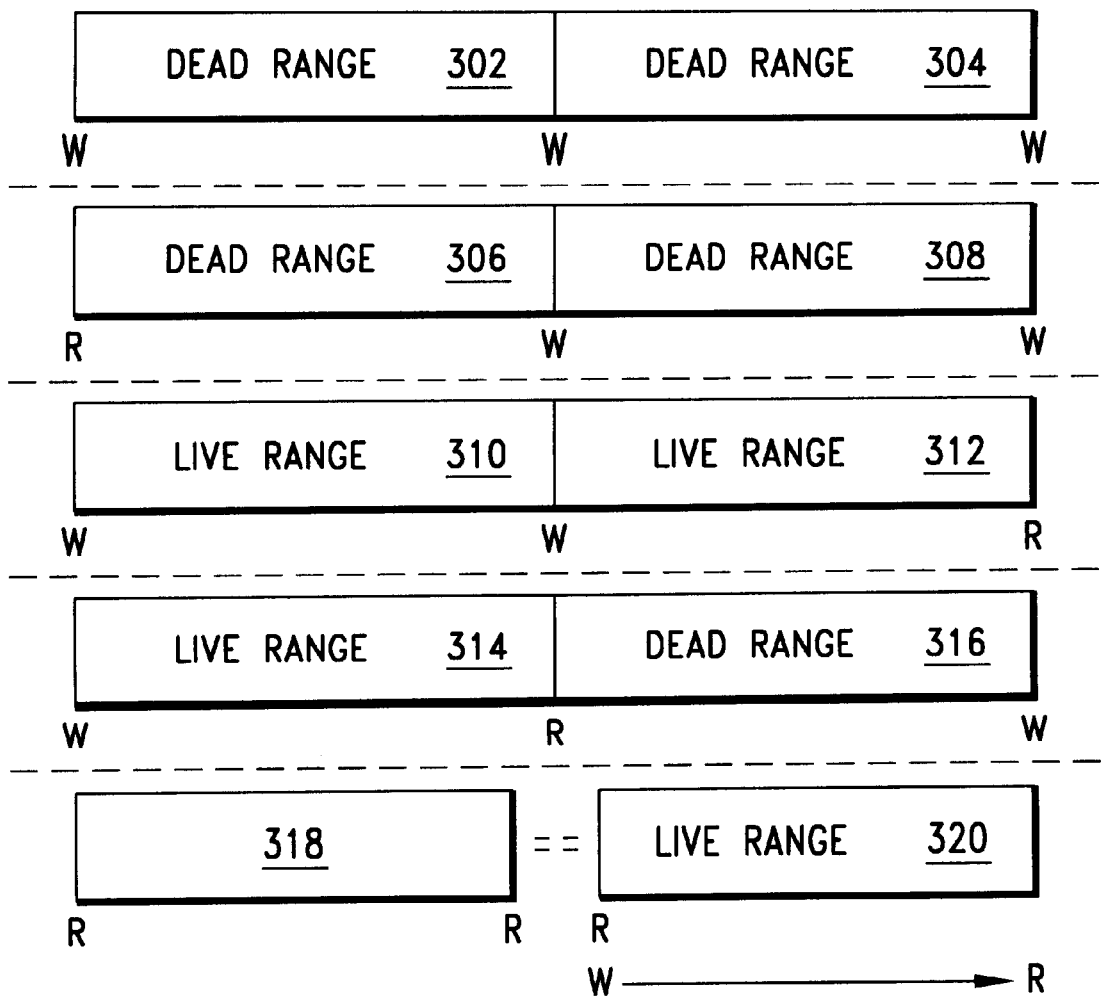
FIG. 3 is a block diagram that illustrates scenarios of a range that may be considered live or dead.

FIG. 3 is a block diagram that illustrates scenarios in which a range 202 (as shown in FIG. 2) may be considered live or dead. Typically, a range 202 that is terminated by a write instruction 208 (as shown in FIG. 2) is a dead range 202, as shown in elements 302, 304, 306, 308, and 316. Conversely, a range 202 that is initiated by a write instruction 208 and terminated by a read instruction 208 is a live range 202, as shown in elements 312 and 314.

When a range 202 is initiated and terminated by a read instruction 208 as shown in element 318, the register pressure tool 102 inserts an additional initiating write instruction 208 before the terminating read instruction 208 for the purpose of defining a typical scenario, as shown in element 320. That is, the new scenario is an initiating write instruction 208 and a terminating read instruction 208 which is a live range 202, as shown in element 320.

More particularly, Table 1 below illustrates a live range 202 wherein the instruction 208 labeled "1" is "x=100," and the instruction 208 labeled "2" is "y=20," and they are assigned to registers 411 (as shown in FIG. 1A). Since "x" and "y" are both read from a register 411 in the instruction 208 labeled "4," "x" and "y" therefore are live during the code range 202. Therefore the registers that "y" and "y" have accessed are both live registers and the "x" and "y" registers 411 may not be re-used during this code range 202.

Alternatively, the instruction 208 labeled "3" is "w=50," and is a write instruction 208 of "w." The instruction 208 labeled "6" is "w=100," and is another write instruction 208 of "w." Therefore, the register 411 accessed by "w" is considered dead between the instruction 208 labeled "3" and the instruction 208 labeled "6."

TABLE 1

| Live Range | |
|---|---|
| instr 1: x = 100; | current live range of x |
| instr 2: y = 20; | current live range of x and y |
| instr 3: w = 50; | first write of w |
| instr 4: z = x − y; | current live range of x and y |
| instr 5: x = 200; | new live range of x begins |
| instr 6: w = 100; | second write of w |

Figure 4A:
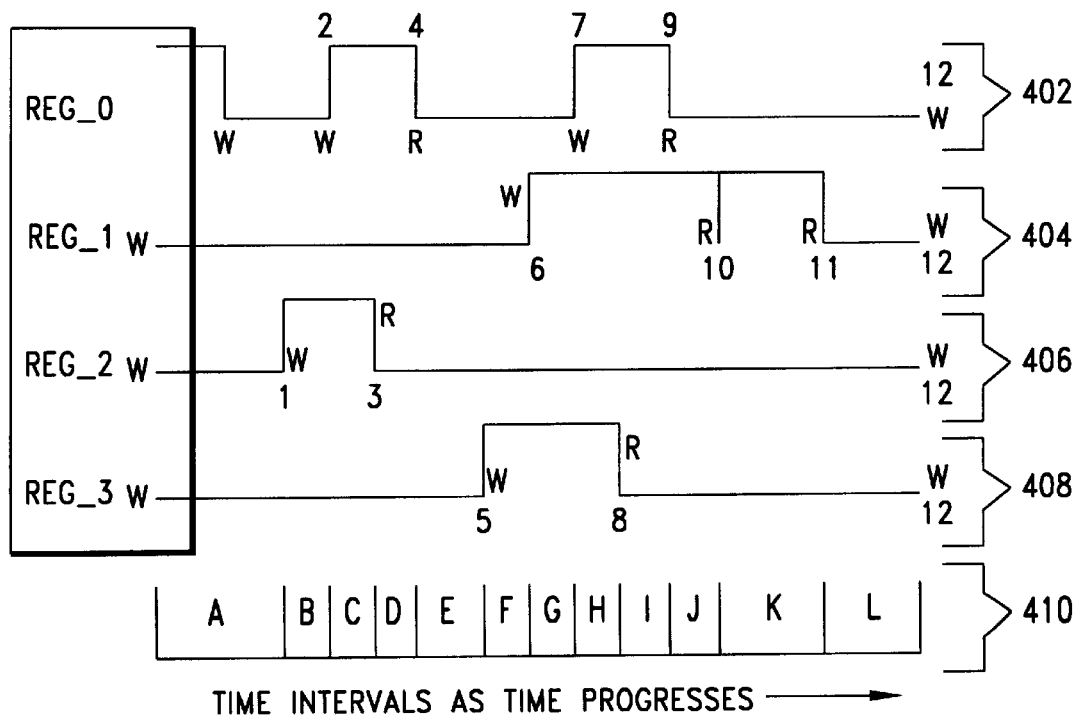
FIG. 4A is a flow diagram that illustrates a typical scenario of instruction events.

FIG. 4A is a flow diagram of a typical scenario of instruction events 430 (as shown in FIG. 2) that operate on registers 411 (as shown in FIG. 1A) and that include read instructions 208 and write instructions 208 (as shown in FIG. 2). Read instructions 208 are shown by the label "R" and write instructions 208 are shown by the label "W." Further, the events are labeled by numbers. For instance, as shown in element 402, events "2," "4," "7," "9," and "12" operate on the register 411 labeled "0." More particularly, events "2," "7," and "12" are write instructions 208, and elements "4" and "9" are read instructions 208. It will be appreciated, that in a computer system 100 (as shown in FIG. 1) the write and read instructions 208 operate on registers 411.

As shown in element 404, events "6," "10," "11," and "12" operate on the register 411 labeled "1." As shown in element 406, events "1," "3," and "12" operate on the register 411 labeled "2." Finally, as shown in element 408, events "5," "8," and "12" operate on the register 411 labeled "3."

Further as shown in element 410, time intervals 438 (as shown in FIG. 2) are identified by labels "A" through "L" that correspond to the time of an event 430 and reflect the progression of time from the time interval 438 labeled "A" to the time interval labeled "L."

It will be appreciated that the final instruction 208 of each register 411 is defined to be a write instruction 208 thereby ensuring that a termination is found for the previous instructions 208 of each register 411. Therefore, in the present example, the event 430 labeled "12" is a write instruction 208 to each register 411.

FIG. 4B is a block diagram that illustrates the information that the register pressure tool 102 maintains and manages, such as register pressure results 184 (as shown in FIG. 2). Recall that the register pressure tool 102 may operate in cooperation with the compilation system 108 or with the simulator 180 (as are shown in FIG. 1A). Therefore, the register pressure tool 102 may process information related to access of registers 411 (as shown in FIG. 1A) by values as a result of the operation of an event 430. As shown in element 430 an event is identified and information related to the level of uncertainty about the registers is stored, as shown in element 432. More particularly, the uncertainty level information 432 may include the registers_with_known_information variable 434, the number_of_live_registers variable 436, and the time interval variable 438 that is associated with the information. Therefore, the register pressure information may be referred to herein as an entry cell variable 437, or a register pressure information variable 437, that includes the event 430 and an associated uncertainty level variable 432, which includes the registers_with_known_information 434, the number_of_live_registers 436, and the time interval 438.

By means of an example four registers 411, such as are discussed with reference to FIG. 4A, having current information associated with two of the registers 411 are associated with an uncertainty level 432 of two. That is, information is unknown about two of the four registers 411 under operation.

The registers_with_known_information variable 434 may be referred to herein as having "register knowledge." Also, the time interval 438 may refer to the current time interval 438 or a previous time interval 438. Therefore, new current information may be added to information related to a previous time interval 438.

It will be appreciated that a variety of notation methods may be used to represent the information managed by the register pressure tool 102. For purposes of explanation, the following notation will be used herein to represent information related to a scenario: "$[register\ knowledge\ 434]$ [number_of_live_registers 436]; [time interval 438]," such as "$_0 1$; T_B." It will be appreciated that the time interval 438 may be omitted in an alternate embodiment, without impacting the operation of determining the maximum number_of_live_registers 436 and the registers_with_known_information variable 434.

For purposes of explanation consider a sample that includes four registers 411 and only the information about the register 411 labeled "0" is known, therefore the uncertainty level 423 is three. Also, the number_of_live_registers 436 is one, and the time interval 438 is "B." This sample may be represented by the following notation: "$_0 1$; T_B." This notation will be stored in an entry cell 437 associated with an uncertainty of three. An entry cell 437 is used in the present embodiment to represent the register pressure information, such as a particular event 430 and the information related to the event 430.

As shown in element 442, an event 430 may have information that is associated with a plurality of uncertainty levels 432. Also, as shown in element 440 there may be a plurality of events 430 associated with information that is maintained and managed by the register pressure tool 102.

Figure 4C:
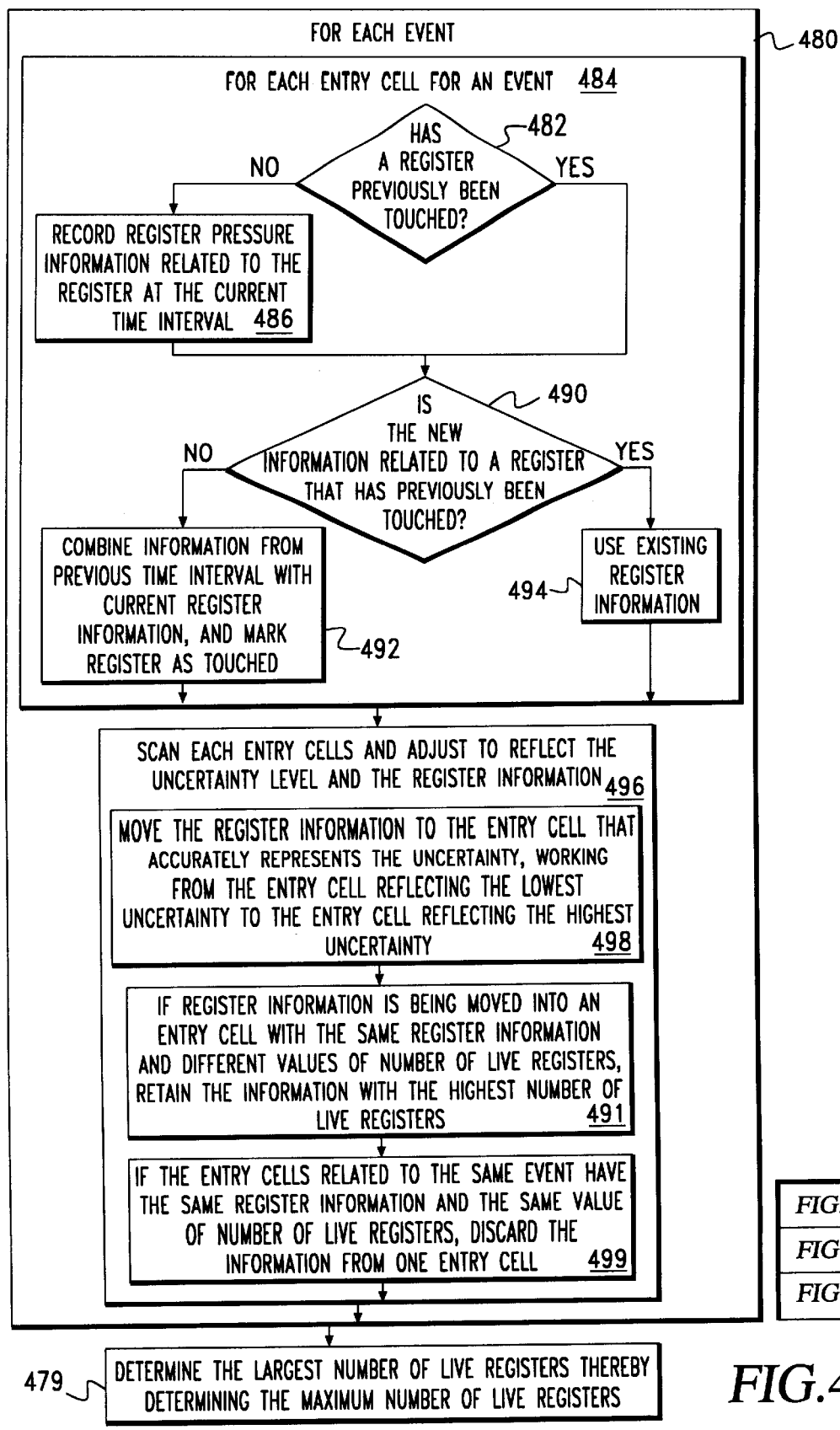
FIG. 4C is a flow diagram that illustrates the operation of the register pressure tool.

FIG. 4C is a flow diagram of the operation of the register pressure tool 102. For each event 430, as shown in element 480 each associated entry cell 437 (as shown in FIG. 4B) may be updated, as shown in element 484. A test of whether a register 411 (as shown in FIG. 1A) has been previously touched is completed, as shown in element 482.

As used herein a register 411 may be "touched" when an instruction 208 accesses a register 411 and knowledge about that instruction 208 is maintained by the register pressure tool 102. It will be appreciated by those skilled in the art that a matrix may be used that maintains a record of whether a register 411 has been previously touched. Other means of managing the information related to whether a register 411 has been touched may be used without departing from the spirit of the present invention.

For example as shown in Table 2, a data structure may be maintained that records "1" when a register 411 has been touched, and "0" when a register 411 has not been touched. Therefore, by maintaining a correspondence between the location of the values of "1" or "0" and the identification of a register 411, register 411 access information may be maintained. As shown in Table 2 registers 411 with labels "2" and "5" have not been touched as indicated by the associated "0." Registers 411 with labels "1," "3," and "4" have been touched as indicated by the associated "1."

By means of an alternative example, different information may be stored that is associated with a register 411, such as a non-zero time stamp. Then, a register 411 would be identified as touched if the information associated with the register 411 is non-zero.

TABLE 2

Touched Register Matrix

| Register Number: | 1 | 2 | 3 | 4 | 5 |
|---|---|---|---|---|---|
| Touched Value: | "1" | "0" | "1" | "1" | "0" |

In order to accumulate information about registers 411 in a computer system 100 (as shown in FIG. 1) at a particular time interval 438 (as shown in FIG. 4B), the register pressure tool 102 may add information about the registers 411 as the information becomes available. That is, the register pressure tool 102 may update information related to a particular time interval 438 as information about the state of a previously untouched register 411 becomes available, typically during a later time interval 438.

Returning to FIG. 4C and when a register 411 has not been previously touched, as shown in element 482, the information related to the register 411 at the current time interval 438 is recorded, as shown in element 486. Then each entry cell 437 is scanned for the purpose of updating new register pressure information about the registers 411. As each entry cell 437 is accessed, a test is performed to determine if the new information is related to a register 411 that has been touched in a previous time interval 438, as shown in element 490. If the register 411 was previously touched as shown in element 494, the existing register information in the registers_with_known_information 434 is re-used. Alternatively, if the information did not exist for a particular register 411 in a previous time interval 438, as shown in element 492 the new information is combined with information from the previous time intervals 438, and the register is marked as touched.

The operation of the register pressure tool 102 moves to element 496, from either element 492 or element 494. Each of the entry cells 437 are scanned and adjusted to reflect the updated uncertainty level 432 by use of the registers_with_known_information 434, as shown in element 496. Any shifting of information to the entry cell 437 that reflects the appropriate uncertainty level 432 is completed. That is, the scanning operation as shown in element 498, may include moving information in entry cells 437 to the appropriate entry cell 437, operating from the entry cell 437 reflecting the lowest uncertainty level 432 to the entry cell 437 reflecting the highest uncertainty level 432. Further, if any entry cells 437 related to the same event 430 have a different value of the number_of_live_registers 436 and the same register knowledge 434, the information related to the highest number_of_live_registers 436 is retained, as shown in element 491. Also, if the entry cells 437 related to the same event 430 have the same number_of_live_registers 436 and the same register knowledge 434, the information associated with one of the entry cells 430 is discarded, as shown in element 499.

Table 3 below illustrates the information in the entry cells 437 representing the scenario illustrated in FIG. 4A and the operation of the register pressure tool 102 as illustrated in FIG. 4C. Therefore, as shown in element 486 of FIG. 4C and with respect to the first event 430 (as shown in FIG. 2), the initial level of uncertainty 432 is four and the corresponding entry cell 430 (as shown in row 1) is assigned the value "$_2 0$; T_A." Since there are no entry cells 430 that have been assigned in a previous time interval 438 (as shown in FIG. 4B), the operation of the register pressure tool 102 moves to element 496 of FIG. 4C. Therefore, the information as shown in row 2, "$_2 0$; T_A," is shifted to the cell corresponding to the first entry and an uncertainty level 432 of three. Recall that the time interval 438 may be omitted.

Further illustrating the present embodiment in Table 3 below and moving to the sixth element 430, and as illustrated in element 486 in FIG. 4C, the new information "$_1 0$; T_F" is recorded in the entry cell 437 associated with the sixth event 430 and an uncertainty level 438 of four (as shown in row 15). Then, as shown in element 492 of FIG. 4C, the new register information "$_1 0$; T_F" (as shown in row 15) is combined with the existing information, "$_3 0$; T_E" in the entry cell 430 corresponding to the fifth event 430 and an uncertainty level 430 of three (as shown in row 14), thereby resulting in the information "$_{1,3} 0$; T_E," which is assigned to the entry cell 437 associated with the sixth event 430 and an uncertainty level of three (as shown in row 16). Also, the register 411 with the label "1" may be marked as touched. It will be appreciated that each entry cell 437 for each event 430 is operated on in a similar fashion as illustrated in elements 480, 484, and 496 of FIG. 4C.

As illustrated in element 496 of FIG. 4C and as shown in the sixth element 430 of Table 3, the information "$_1 0$; T_F" is shifted as shown in row 17 to the appropriate uncertainty level 432 of three. The information "$_{1,3} 0$; T_E" is shifted as shown in row 17 to the appropriate uncertainty level 432 of two. The information "$_{0,1,3} 1$; T_D" is shifted as shown in row 17 to the appropriate uncertainty level 432 of one. Also, the information "$_{0,1,2,3} 2$; T_C" is shifted as shown in row 17 to the appropriate uncertainty level 432 of zero.

As illustrated in element 491 of FIG. 4C when two entry cells 437 have the same register knowledge 434 and different values of the number_of_live_registers 436, the information with the highest number_of_live_registers 436 is retained. Therefore as shown with respect to the tenth element in Table 3, the information "$_{0,1,3} 3$; T_H," as shown in the entry cell 437 associated with row 29 and the uncertainty level of one, is retained instead of the information "$_{0,1,3} 1$; T_F," as shown in the entry cell 437 associated with row 28 and the uncertainty level 432 of one, since the same register information, "$_{0,1,3}$" is associated with different values of the number_of_live_registers 436. That is the number_of_live_registers 436 of three is larger than one, and is retained.

As illustrated in element 499 of FIG. 4C, when two entry cells 437 have the same register knowledge 434 and the same value of the number_of_live_registers 436, the information from one of the entry cells 430 is discarded. Therefore as shown with respect to the eighth element in Table 3, the information "$_{0,1,3} 1$; T_F," as shown in the entry cell 437 in row 23 and associated with the uncertainty level 432 of one, is retained and the information "$_{0,1,3} 1$; T_D," as shown in the entry cell 437 in row 22 and associated with the uncertainty level 432 of one, is discarded.

As shown in element 479, the present embodiment determines the largest number_of_live_registers 436 for the executing program and thereby determines the global maximum value 204. That is, the present embodiment novelly maintains information about the global maximum value 204, and in the present example the global maximum value 204 is three and occurs at time interval H.

TABLE 3

Entry Cells for Scenario of FIG. 4A

| | | UNCERTAINTY LEVEL | | | | |
|---|---|---|---|---|---|---|
| Row | Event | 4 | 3 | 2 | 1 | 0 |
| 1 | 1 | $_2 0$; T_A | | | | |
| 2 | 1 | | $_2 0$; T_A | | | |
| 3 | 2 | $_0 0$; T_B | | | | |
| 4 | 2 | | $_{2,0} 0$; T_A | | | |
| 5 | 2 | | $_0 0$; T_B | $_{2,0} 0$; T_A | | |
| 6 | 3 | $_2 1$; T_C | | | | |
| 7 | 3 | | | $_{0,2} 1$; T_B | $_{0,2} 0$; T_A | |
| 8 | 3 | | $_2 1$; T_C | | $_{0,2} 1$; T_B | |
| 9 | 4 | $_0 1$; T_D | | | | |

TABLE 3-continued

Entry Cells for Scenario of FIG. 4A

| Row | Event | UNCERTAINTY LEVEL | | | | |
|---|---|---|---|---|---|---|
| | | 4 | 3 | 2 | 1 | 0 |
| 10 | 4 | | $_0,2^2$; T_C | $_0,2^1$; T_B | | |
| 11 | 4 | | $_0^1$; T_D | $_0,2^2$; T_C | | |
| 12 | 5 | $_3 0$; T_E | | | | |
| 13 | 5 | | $_0,3^1$; T_D | $_0,2,3^2$; T_C | | |
| 14 | 5 | | $_3 0$; T_E | $_0,3^1$; T_D | $_0,2,3^2$; T_C | |
| 15 | 6 | $_1 0$; T_F | | | | |
| 16 | 6 | | $_1,3 0$; T_E | $_0,1,3^1$; T_D | $_0,1,2,3^2$; T_C | |
| 17 | 6 | | $_1 0$; T_F | $_1,3 0$; T_E | $_0,1,3^1$; T_D | $_0,1,2,3^2$; T_C |
| 18 | 7 | $_0 0$; T_G | | | | |
| 19 | 7 | | $_0,1 0$; T_F | $_0,1,3 0$; T_E | $_0,1,3^1$; T_D | |
| 20 | 7 | | $_0 0$; T_G | $_0,1 0$; T_F | $_0,1,3^1$; T_D | $_0,1,2,3^2$; T_C |
| 21 | 8 | $_3 1$; T_H | | | | |
| 22 | 8 | | $_0,3^1$; T_G | $_0,1,3^1$; T_F | $_0,1,3^1$; T_D | $_0,1,2,3^2$; T_C |
| 23 | 8 | | $_3 1$; T_H | $_0,3^1$; T_G | $_0,1,3^1$; T_F | $_0,1,2,3^2$; T_C |
| 24 | 9 | $_0 1$; T_I | | | | |
| 25 | 9 | | $_0,3^2$; T_H | $_0,3^1$; T_G | $_0,1,3^1$; T_F | $_0,1,2,3^2$; T_C |
| 26 | 9 | | $_0^1$; T_I | $_0,3^2$; T_H | $_0,1,3^1$; T_F | $_0,1,2,3^2$; T_C |
| 27 | 10 | $_1^1$; T_J | | | | |
| 28 | 10 | | $_0,1^2$; T_I | $_0,1,3^3$; T_H | $_0,1,3^1$; T_F | $_0,1,2,3^2$; T_C |
| 29 | 10 | | $_1^1$; T_J | $_0,1^2$; T_I | $_0,1,3^3$; T_H | $_0,1,2,3^2$; T_C |
| 30 | 11 | $_1^1$; T_K | | | | |
| 31 | 11 | | $_1^1$; T_J | $_0,1^2$; T_H | $_0,1,3^3$; T_H | $_0,1,2,3^2$; T_C |
| 32 | 11 | | $_1^1$; T_K | $_0,1^2$; T_H | $_0,1,3^3$; T_H | $_0,1,2,3^2$; T_C |
| 33 | 12 (Reg_0) | $_0 0$; T_L | | | | |
| 34 | 12 (Reg_0) | | $_0,1^1$; T_K | $_0,1^2$; T_H | $_0,1,3^3$; T_H | $_0,1,2,3^2$; T_C |
| 35 | 12 (Reg_0) | | $_0 0$; T_L | $_0,1^2$; T_H | $_0,1,3^3$; T_H | $_0,1,2,3^2$; T_C |
| 36 | 12 (Reg_1) | $_1 0$; T_L | | | | |
| 37 | 12 (Reg_1) | | $_0,1 0$; T_L | $_0,1^2$; T_H | $_0,1,3^3$; T_H | $_0,1,2,3^2$; T_C |
| 38 | 12 (Reg_1) | | $_0 0$; T_L | $_0,1^2$; T_H | $_0,1,3^3$; T_H | $_0,1,2,3^2$; T_C |
| 39 | 12 (Reg_2) | $_2 0$; T_L | | | | |
| 40 | 12 (Reg_2) | | $_0,2 0$; T_L | $_0,1,2^2$; T_H | $_0,1,2,3^3$; T_H | $_0,1,2,3^2$; T_C |
| 41 | 12 (Reg_2) | | $_2 0$; T_L | $_0,2 0$; T_L | $_0,1,2^2$; T_H | $_0,1,2,3^3$; T_H |
| 42 | 12 (Reg_3) | $_3 0$; T_L | | | | |
| 43 | 12 (Reg_3) | | $_2,3 0$; T_L | $_0,2,3 0$; T_L | $_0,1,2,3^2$; T_H | $_0,1,2,3^3$; T_H |
| 44 | 12 (Reg_3) | | $_3 0$; T_L | $_2,3 0$; T_L | $_0,2,3 0$; T_L | $_0,1,2,3^3$; T_H |

The present embodiment may alternatively also operate with information that is partitioned. For instance, partitioning may reflect specific ranges of time, or specific ranges of events, or a particular section of the code, such as an identified procedure. Therefore, when partitioning is used in the present embodiment, local maximum pressure points 206 associated with a partition 502 (as shown in FIG. 2) may be maintained in addition to the global maximum pressure point 204.

Figure 5A:
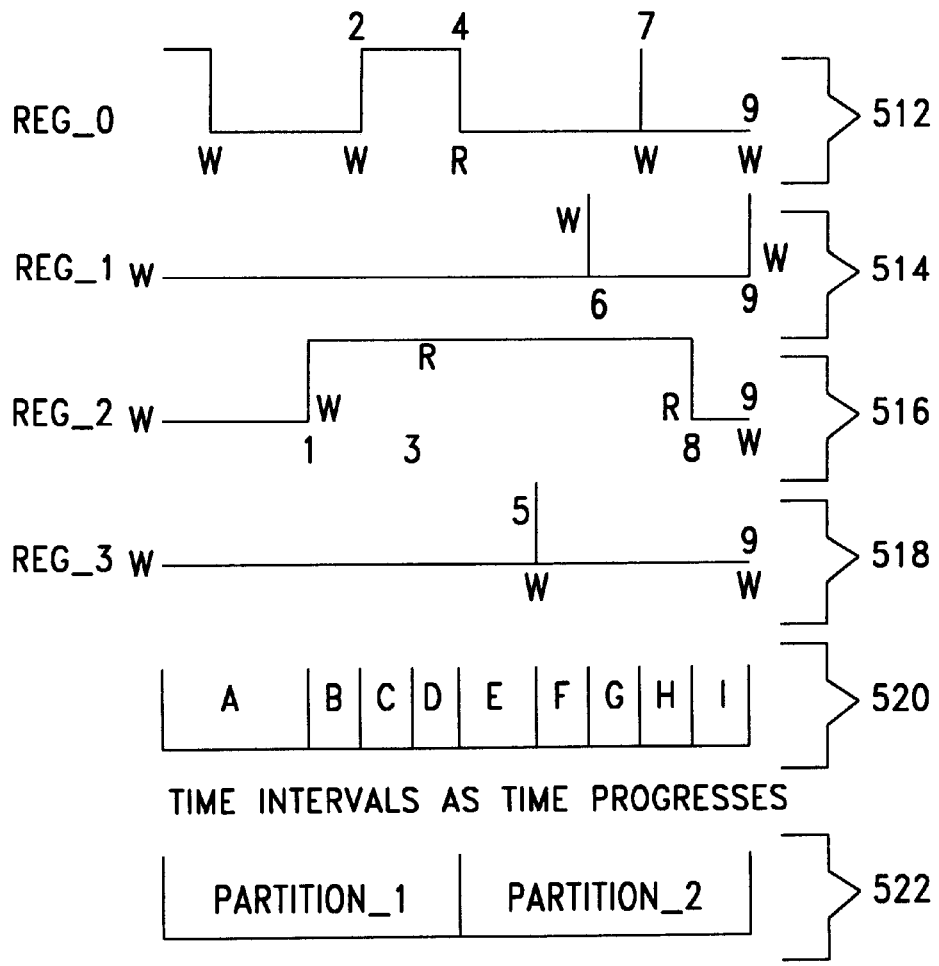
FIG. 5A is a flow diagram that illustrates a typical scenario of instruction events and that includes partitioning.

FIG. 5A is a flow diagram of a typical scenario of instruction events 430 (as shown in FIG. 2) that operate on registers 411 (as shown in FIG. 1A) that include partitioning. As shown in element 512, events "2," "4," "7," and "9" operate on the register 411 labeled "0." More particularly, events "2," "7," and "9" are write instructions 208, and event "4" is a red instruction 208.

As shown in element 514, events "6" and "9" operate on the register 411 labeled "1." As shown in element 516, events "1," "3," "8," and "9" operate on the register 411 labeled "2." Finally, as shown in element 518, events "5" and "9" operate on the register 411 labeled "3".

Further as shown in element 520, time intervals 438 (as shown in FIG. 2) are identified by labels "A" through "I" that correspond to the time of an event and reflect the progression of the time interval 438 labeled "A" to the time interval 438 labeled "I." As shown in element 522 the partition 502 labeled "1" includes the time intervals 438 labeled "A" through "D," and the partition 502 labeled "2" includes the time intervals 438 labeled "E" through "I." Partitions will be represented herein as "P_[partition number]," such as "P_1."

Partitioned Embodiment

FIG. 5B is an alternative embodiment of the register pressure tool 102 and is a block diagram that illustrates the information that the register pressure tool 102 maintains and manages when the information is partitioned, such as register pressure results 184 (as shown in FIG. 2). Therefore, as shown in element 430 an event is identified and information related to the level of uncertainty about the registers is stored, as shown in element 432. More particularly, the incertainty level information 432 may include the registers_with_known_information variable 434, the number_of_live_registers variable 436, the time interval variable 438 that is associated with the information, and the partition number variable 502 that is associated with the information. It will be appreciated that each partition number 502 may have unique information about the registers_with_known_information 434, the number_of_live_registers 436, and the time interval 438. Further, the entry cell 437 may include the event 430 and an associated uncertainty level 432, which includes the registers_with_known_information 434, the number_of_live_registers 436, the time interval 438, and the partition number 502.

It will be appreciated that a variety of notation methods may be used to represent the information managed by the register pressure tool 102. For purposes of explanation, the following notation will be used herein to represent information related to a partition scenario: "[$register\ knowledge\ 434$] [number_of_live_registers 436]; [time interval 438]; [partition number 502]," such as "$_0 1$; T_B; P_1."

For purposes of explanation consider a sample that includes four registers 411, and only the information about the register 411 labeled "0" is known, therefore the uncertainty level 423 is three. Also, the number_of_live_registers 436 is one, the time interval 438 is "B," and the first partition is associated with the information. The sample may be represented by the following notation: "$_0 1$; T_B; P_1." This notation will be stored in an entry cell 437 associated with _uncertainty of three.

FIG. 5C is an alternative embodiment and a flow diagram of the operation of the register pressure tool 102 when the information is partitioned. For each event 430, as shown in element 480 each entry cell 437 (as shown in FIG. 2) may be updated, as shown in element 484. A test of whether a register 411 (as shown in FIG. 1A) has been previously touched is completed, as shown in element 482. When register 411 has not been previously touched, as shown in element 482, the register pressure information related to the register 411 at the current time interval 438 is recorded, as shown in element 486. Then each entry cell 437 is scanned for the purpose of updating new information about registers 411.

As each entry cell 437 is accessed, a test is performed to determine if the new information is related to a register 411 that has been touched in a previous time interval, as shown in element 490. As shown in element 495, if the register 411 was previously touched and the information is associated with the represented partition 502 (as shown in FIG. 2), the existing information about registers_with_known_ information 434 is re-used represented partition 502. Alternatively, if the information associated with a represented partition 502 in a previous time interval 438 does not exist for a particular register 411, as shown in element 493, the new information is combined with information from the previous time interval 438 for the represented partition 502, and the register 411 is marked as touched.

The operation of the register pressure tool 102 moves to element 496, from either element 493 or element 495. Each of the entry cells 437 are scanned and adjusted to reflect the updated uncertainty level 432 by use of the registers_with_ known_information variable 434, as shown in element 496. Any shifting of information to the entry cell 437 that reflects the appropriate uncertainty level 432 is completed. That is, the scanning operation as shown in element 497, may include moving information in entry cells 437 to the appropriate entry cell 437, operating from the entry cell 437 reflecting the lowest uncertainty level 432 to the entry cell 437 reflecting the highest uncertainty level 432, while maintaining information about the registers 411 and their association with particular partitions 502.

For each partition number 502, as shown in element 485, if any entry cells 437 related to the same event 430 have a different value of the number_of_live_registers 436 and the same register knowledge 434, the information related to the highest number_of_live_registers 436 is retained, as shown in element 487. Also for each partition number 502, if the entry cells 437 related to the same event 430 have the same value of the number_of_live_registers 436 and the same register knowledge 434, the information associated with one of the entry cells 430 is discarded, as shown in element 489.

Table 4 below illustrates the information in the entry cells 437 related to the scenario that includes partitioning as illustrated in FIG. 5A, and the operation of the register pressure tool 102 as illustrated in FIG. 5C. Therefore, as shown in element 486 of FIG. 5C and with respect to the first event 430 (as shown in FIG. 2), the initial level of uncertainty 432 is four and the corresponding entry cell 430 (as shown in row 1) is assigned the value "$_2$0; T_A; P_1." Since there are no entry cells 430 that have been assigned in a previous time interval 438 (as shown in FIG. 4B), the operation of the register pressure tool 102 moves to element 496 of FIG. 4C. Therefore, the information "$_2$0; T_A; P_1" as shown in row 2 is shifted to the cell corresponding to the first entry and an uncertainty level 432 of three. Recall that the time interval 438 may be omitted.

Further illustrating the present embodiment in Table 4 below by moving to the seventh element 430, and as illustrated in element 486 in FIG. 5C, the new information as shown in row 18, "$_0$0; T_G; P_2," is recorded in the entry cell 437 associated with the seventh event 430 and an uncertainty level 438 of four. Then, as shown in element 493 of FIG. 5C, the new register information "$_0$0; T_G; P_2" is combined with the existing information, "$_1$0; T_F; P_2" in the entry cell 430 (as shown in row 17) corresponding to the sixth event 430 and an uncertainty level 430 of three, thereby resulting in the information "$_{0,1}$0; T_F; P_2," (as shown in row 19) which is assigned to the entry cell 437 associated with the seventh event 430 and an uncertainty level of three. Also the register 411 with the label "0" may be marked as touched.

As illustrated in element 496 of FIG. 5C and as shown in the seventh element 430 (as shown in row 20) of Table 4, the information "$_0$0; T_G; P_2" is shifted to the appropriate uncertainty level 432 of three. The information "$_{0,1}$0; T_F; P_2" is shifted to row 20 and to the appropriate uncertainty level 432 of two.

The information related to an uncertainty level 432 of one that is associated with the seventh entry 430 (as shown in row 20) is related to both the partition 502 labeled "1" and the partition 502 labeled "2." Therefore, as shown in element 497 of FIG. 5C, the information "$_{0,1,3}$1; T_D; P_2" and "$_{0,1,3}$1; T_E; P_2" are both shifted to the appropriate uncertainty level 432 of one as shown in row 20.

Also, the information "$_{0,1,2,3}$2; T_C; P_1" is shifted to the appropriate uncertainty level 432 of zero as shown in row 20.

As illustrated in element 487 of FIG. 5C when two entry cells 437 have the same register knowledge 434 and different values of the number_of_live_registers 436, the information with the highest number_of_live_registers 436 is retained with respect to each partition number 502. Therefore as shown with respect to the third element in Table 4, as shown in row 8 the information "$_{0,2}$1; T_B; P_1" is retained instead of the information as shown in row 7, "$_{0,2}$0; T_A; P_1," since the same register information, "$_{0,2}$" is associated with different values of the number_of_live_ registers 436. That is the number_of_live_registers 436 of one is larger than zero, and is retained.

As illustrated in element 489 of FIG. 5C when two entry cells 437 have the same register knowledge 434 and the same values of the number_of_live_registers 436, the information from one of the entry cells 430 is discarded. Therefore as shown with respect to the eighth element in Table 4, as shown in row 23 the information "$_{0,1,2,3}$2; T_D; P_1" is retained and as shown in row 22 the information "$_{0,1,2,3}$2; T_C; P_1" is discarded.

Therefore, the present alternate embodiment novelly maintains information about the local maximum values 206. As shown in element 478, the present embodiment determines the largest number_of_live_registers 436 associated with the partition 502, for the executing program, and thereby determines the local maximum value 206. In the present example the local maximum value 206 associated with the partition 502 labeled "1" is two and occurs at the time interval 438 labeled "D" and the time interval 438 labeled "C." Also the local maximum value 206 associated with the partition 502 labeled "2" is one and occurs at the time intervals 438 labeled "E," "F," "G," and "H."

TABLE 4

Entry Cells for Scenario of FIG. 5A Including Partitioning

| ROW | EVENT | UNCERTAINTY LEVEL | | | | |
|---|---|---|---|---|---|---|
| | | 4 | 3 | 2 | 1 | 0 |
| 1 | 1 | $_2 0$; $P\_1$ | | | | |
| 2 | 1 | | $_2 0$; $T\_A$; $P\_1$ | | | |
| 3 | 2 | $_0 0$; $T\_B$; $P\_1$ | | | | |
| 4 | 2 | | $_{2,0} 0$; $T\_A$; $P\_1$ | | | |
| 5 | 2 | | $_0 0$; $T\_B$; $P\_A$ | $_{2,0} 0$; $T\_A$; $P\_1$ | | |
| 6 | 3 | $_2 1$; $T\_C$; $P\_1$ | | | | |
| 7 | 3 | | $_{0,2} 1$; $T\_B$; $P\_1$ | $_{0,2} 0$; $T\_A$; $P\_1$ | | |
| 8 | 3 | | $_2 1$; $T\_C$; $P\_1$ | $_{0,2} 1$; $T\_B$; $P\_1$ | | |
| 9 | 4 | $_0 1$; $T\_D$; $P\_1$ | | | | |
| 10 | 4 | | $_{0,2} 2$; $T\_C$; $P\_1$ | $_{0,2} 1$; $T\_B$; $P\_1$ | | |
| 11 | 4 | | $_0 1$; $T\_D$; $P\_1$ | $_{0,2} 2$; $T\_C$; $P\_1$ | | |
| 12 | 5 | $_3 0$; $T\_E$; $P\_2$ | | | | |
| 13 | 5 | | $_{0,3} 1$; $T\_D$; $P\_1$ | $_{0,2,3} 2$; $T\_C$; $P\_1$ | | |
| 14 | 5 | | $_3 0$; $T\_E$; $P\_2$ | $_{0,3} 1$; $T\_D$; $P\_1$ | $_{0,2,3} 2$; $T\_C$; $P\_1$ | |
| 15 | 6 | $_1 0$; $T\_F$; $P\_2$ | | | | |
| 16 | 6 | | $_{1,3} 0$; $T\_E$; $P\_2$ | $_{0,1,3} 1$; $T\_D$; $P\_1$ | $_{0,1,2,3} 2$; $T\_C$; $P\_1$ | |
| 17 | 6 | | $_1 0$; $T\_F$; $P\_2$ | $_{1,3} 0$; $T\_E$; $P\_2$ | $_{0,1,3} 1$; $T\_D$; $P\_1$ | $_{0,1,2,3} 2$; $T\_C$; $P\_1$ |
| 18 | 7 | $_0 0$; $T\_G$; $P\_2$ | | | | |
| 19 | 7 | | $_{0,1} 0$; $T\_F$; $P\_2$ | $_{0,1,3} 0$; $T\_E$; $P\_2$ | $_{0,1,3} 1$; $T\_D$; $P\_1$ | $_{0,1,2,3} 2$; $T\_C$; $P\_1$ |
| 20 | 7 | | $_0 0$; $T\_G$; $P\_2$ | $_{0,1} 0$; $T\_F$; $P\_2$ | $_{0,1,3} 1$; $T\_D$; $P\_1$ | $_{0,1,2,3} 2$; $T\_C$; $P\_1$ - - - $_{0,1,3} 0$; $T\_E$; $P\_2$ |
| 21 | 8 | $_2 1$; $T\_H$; $P\_2$ | | | | |
| 22 | 8 | | $_{0,2} 1$; $T\_G$; $P\_2$ | $_{0,1,2} 1$; $T\_F$; $P\_2$ | $_{0,1,2,3} 2$; $T\_D$; $P\_1$ | $_{0,1,2,3} 2$; $T\_C$; $P\_1$ - - - $_{0,1,2,3} 1$; $T\_E$; $P\_2$ |
| 23 | 8 | | $_2 1$; $T\_H$; $P\_2$ | $_{0,2} 1$; $T\_G$; $P\_2$ | $_{0,1,2} 1$; $T\_F$; $P\_2$ | $_{0,1,2,3} 2$; $T\_D$; $P\_1$ - - - $_{0,1,2,3} 1$; $T\_E$; $P\_2$ |
| 24 | 9, Reg_0 | $_0 0$; $T\_I$; $P\_2$ | | | | |
| 25 | 9, Reg_0 | | $_{0,2} 1$; $T\_H$; $P\_2$ | $_{0,2} 1$; $T\_G$; $P\_2$ | $_{0,1,2} 1$; $T\_F$; $P\_2$ | $_{0,1,2,3} 2$; $T\_D$; $P\_1$ - - - $_{0,1,2,3} 1$; $T\_E$; $P\_2$ |
| 26 | 9, Reg_0 | | $_0 0$; $T\_I$; $P\_2$ | $_{0,2} 1$; $T\_H$; $P\_2$ | $_{0,1,2} 1$; $T\_F$; $P\_2$ | $_{0,1,2,3} 2$; $T\_D$; $P\_1$ - - - $_{0,1,2,3} 1$; $T\_E$; $P\_2$ |
| 27 | 9, Reg_1 | $_1 0$; $T\_I$; $P\_2$ | | | | |
| 28 | 9, Reg_1 | | $_1 0$; $T\_I$; $P\_2$ | $_{0,1,2} 1$; $T\_H$; $P\_2$ | $_{0,1,2} 1$; $T\_F$; $P\_2$ | $_{0,1,2,3} 2$; $T\_D$; $P\_1$ - - - $_{0,1,2,3} 1$; $T\_E$; $P\_2$ |
| 29 | 9, Reg_1 | | $_1 0$; $T\_I$; $P\_2$ | $_{0,1} 0$; $T\_I$; $P\_2$ | $_{0,1,2} 1$; $T\_H$; $P\_2$ | $_{0,1,2,3} 2$; $T\_D$; $P\_1$ - - - $_{0,1,2,3} 1$; $T\_E$; $P\_2$ |
| 30 | 9, Reg_2 | $_2 0$; $T\_I$; $P\_2$ | | | | |
| 31 | 9, Reg_2 | | $_{1,2} 0$; $T\_I$; $P\_2$ | $_{0,1,2} 0$; $T\_I$; $P\_2$ | $_{0,1,2} 1$; $T\_H$; $P\_2$ | $_{0,1,2,3} 2$; $T\_D$; $P\_1$ - - - $_{0,1,2,3} 1$; $T\_E$; $P\_2$ |
| 32 | 9, Reg_2 | | $_2 0$; $T\_I$; $P\_2$ | $_{1,2} 0$; $T\_I$; $P\_2$ | $_{0,1,2} 1$; $T\_H$; $P\_2$ | $_{0,1,2,3} 2$; $T\_D$; $P\_1$ - - - $_{0,1,2,3} 1$; $T\_E$; $P\_2$ |
| 33 | 9, Reg_3 | $_3 0$; $T\_I$; $P\_2$ | | | | |
| 34 | 9, Reg_3 | | $_{2,3} 0$; $T\_I$; $P\_2$ | $_{1,2,3} 0$; $T\_I$; $P\_2$ | $_{0,1,2,3} 1$; $T\_H$; $P\_2$ | $_{0,1,2,3} 2$; $T\_D$; $P\_1$ - - - $_{0,1,2,3} 1$; $T\_E$; $P\_2$ |
| 35 | 9, Reg_3 | | $_3 0$; $T\_I$; $P\_2$ | $_{2,3} 0$; $T\_I$; $P\_2$ | $_{1,2,3} 0$; $T\_I$; $P\_2$ | $_{0,1,2,3} 2$; $T\_D$; $P\_1$ - - - $_{0,1,2,3} 1$; |

TABLE 4-continued

Entry Cells for Scenario of FIG. 5A Including Partitioning

| ROW | EVENT | UNCERTAINTY LEVEL | | | | |
|---|---|---|---|---|---|---|
| | | 4 | 3 | 2 | 1 | 0 |
| | | | | | | T_H; P_2 |

Alternative Embodiments

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus the foregoing descriptions of specific embodiments of the register pressure tool are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A method for determining the maximum number of live registers in a computer system, said computer system having an executing computer program having at least one instruction that accesses said registers, said method comprising:

including a read instruction in said instructions, and said live registers being associated with said read instruction;

associating events in said computer program with said instructions, and thereby associating said accessed registers with said events;

wherein, for each said event:

identifying when said event is associated with each said accessed register, determining when each said accessed register associated with said event is said live register, and representing said live registers associated with said event quantity by a number_of_live_registers variable associated with said event;

identifying each said accessed register associated with said event as touched with respect to said event, and representing said touched registers associated with said event by a registers_with_known_information variable associated with said event;

identifying each register pressure information variable associated with said event, said register pressure information variable including said number_of_live_registers variable associated with said event and said registers_with_known_information variable associated with said event, and recording said register pressure information variable associated with said event when said registers_with_known_information variable associated with said register pressure information variable corresponding to said event represents said registers that have not been previously touched;

combining said register pressure information variable corresponding to a previous said each event with said register pressure information variable corresponding to said event, when said registers_with_known_information variable associated with said register pressure information variable corresponding to said event represents a said register that has not been previously touched;

retaining said register pressure information variable corresponding to said previous each event when said registers_with_known_information variable associated with said register pressure information variable corresponding to said event is equivalent to said registers_with_known_information variable associated with said register pressure information variable corresponding to said previous each event;

associating said register pressure information variable corresponding to said event with an uncertainty level variable that represents said registers associated with said event that have not been touched quantity;

retaining said register pressure information variable with a largest value of said number_of_live_registers variable associated with said event when said register pressure information variable is associated with: different values of said number_of_live_registers variables associated with said event and equivalent values of said registers_with_known_information variables associated with said event; and retaining one said register pressure information variable associated with said event when a plurality of said register pressure information variables is associated with said event, and said number_of_live_registers variables and said registers_with_known_information variables associated with said plurality of said register pressure information variables are equivalent; and determining a largest value of said number_of_live_registers variable associated with said events in said computer program and thereby identifying said maximum number of live registers in said computer system.

2. The method as set forth in claim 1, further comprising: wherein said associating said register pressure information variable step includes working from said register pressure information variable associated with a lowest value of said uncertainty level variable to said register pressure information variable associated with a highest value of said uncertainty level variable.

3. The method as set forth in claim 1, further comprising: including a write instruction in said instructions, said registers accessed by said write instruction being dead registers and touched registers thereby identifying said touched registers as dead or live.

4. The method as set forth in claim 1, further comprising: including a time interval variable in said register pressure information variable thereby associating said event with time during execution of said computer program.

5. The method as set forth in claim 1, further comprising: wherein said computer program is executed by a compilation system thereby improving compilation in said computer system by determining said maximum number of live registers in said computer system.

6. The method as set forth in claim 1, further comprising: wherein said computer program is executed by a simulator thereby improving simulation in said computer system by determining said maximum number of live registers in said computer system.

7. The method for determining the maximum number of live registers in a computer system, said computer system having an executing computer program having at least one instruction that accesses said registers, said method comprising:
  including a read instruction in said instructions, and said live registers being associated with said read instruction;
  identifying at least two partitions in said computer program;
  associating events in said computer program with said instructions in a said partition, and thereby associating said accessed registers with said events and said partition;
  wherein, for each said event:
    identifying when said event is associated with each said accessed register, determining when each said accessed register associated with said event is said live register, and representing said live registers associated with said event quantity by a number_of_live_registers variable associated with said event;
    identifying each said accessed register associated with said event as touched with respect to said event, and representing said touched registers associated with said event by a registers_with_known_information variable associated with said event;
    identifying said partition associated with said event and representing said partition by a partition variable associated with said event;
    identifying each register pressure information variable associated with said event, said register pressure information variable including said number_of_live_registers variable associated with said event, said registers_with_known_information variable associated with said event, and said partition variable associated with said event; and recording said register pressure information variable associated with said event and said partition variable when said registers_with_known_information variable associated with said register pressure information variable corresponding to said event and said partition variable represents said registers that have not been previously touched;
    combining said register pressure information variable corresponding to a previous said each event and said partition variable with said register pressure information variable corresponding to said event and said partition variable, when said registers_with_known_information variable associated with said register pressure information variable corresponding to said event and said partition variable represents a said register that has not been previously touched;
    retaining said register pressure information variable corresponding to said previous each event and said partition variable when said registers_with_known_information variable associated with said register pressure information variable corresponding to said event and said partition variable is equivalent to said registers_with_known_information variable associated with said register pressure information variable corresponding to said previous each event and said partition variable;
    associating said register pressure information variable corresponding to said event and said partition variable with an uncertainty level variable that represents said registers associated with said event and said partition variable that have not been touched quantity;
    retaining said register pressure information variable with a largest value of said number_of_live_registers variable associated with said event and said partition variable when said register pressure information variable is associated with: different values of said number_of_live_registers variables associated with said event and said partition variable, and equivalent values of said registers_with_known_information variables associated with said event and said partition variable; and
    retaining one said register pressure information variable associated with said event and said partition variable when a plurality of said register pressure information variables is associated with said event and said partition variable, and said number_of_live_registers variables and said registers_with_known_information variables associated with said plurality of said register pressure information variables are equivalent; and
    determining a largest value of said number_of_live_registers variable associated with said events and said partition variable in said computer program and thereby identifying said maximum number of live registers associated with said partition in said computer system.

8. A register pressure apparatus for determining the maximum number of live registers in a computer system, said computer system having an executing computer program having at least one instruction that accesses said registers, said apparatus comprising:
  said instruction including a read instruction, and said live registers being associated with said read instruction;
  events in said computer program being associated with said instructions, and thereby said accessed registers being associated with said events;
  wherein, for each said event:
    a number_of_live_registers variable associated with said event, and when said live registers are associated with said event said number_of_live_registers variable representing said associated live registers quantity;
    a registers_with_known_information variable associated with said event and representing each said accessed register associated with said event as touched with respect to said event;
    each register pressure information variable associated with said event, said register pressure information variable including said number_of_live_registers variable associated with said event and said registers_with_known_information variable associated with said event, and said register pressure information variable associated with said event being recorded when said registers_with_known_information variable associated with said register pressure information variable corresponding to said event represents said registers that have not been previously touched;
    said register pressure information variable corresponding to a previous said each event being combined with said register pressure information variable corresponding to said event, when said registers_with_known_information variable associated with said register pressure information variable corresponding to said event represents a said register that has not been previously touched;
    said register pressure information variable corresponding to said previous each event being retained when said registers_with_known_information variable associated with said register pressure information variable corresponding to said event is equivalent to said registers_with_known_information variable associated with said register pressure information variable corresponding to said previous each event;

an uncertainty level variable that represents said registers associated with said event that have not been touched quantity, said uncertainty level variable being associated with said register pressure information variable corresponding to said event;

said register pressure information variable with a largest value of said number_of_live_registers variable associated with said event being retained when said register pressure information variable is associated with: different values of said number_of_live_registers variables associated with said event and equivalent values of said registers_with_known_information variables associated with said event; and one said register pressure information variable associated with said event being retained when a plurality of said register pressure information variables is associated with said event, and said number_of_live_registers variables and said registers_with_known_information variables associated with said plurality of said register pressure information variables are equivalent; and a largest value of said number_of_live_registers variable associated with said events in said computer program being identified and thereby said maximum number of live registers in said computer system being identified.

9. The register pressure apparatus as set forth in claim 8, further comprising: wherein said uncertainty level variable is associated with said register pressure information variable corresponding to said event by working from said register pressure information variable associated with a lowest value of said uncertainty level variable to said register pressure information variable associated with a highest value of said uncertainty level variable.

10. The register pressure apparatus as set forth in claim 8, further comprising: said instructions including a write instruction, said registers accessed by said write instruction being dead registers and touched registers thereby identifying said touched registers as dead or live.

11. The register pressure apparatus as set forth in claim 8, further comprising: said register pressure information variable including a time interval variable and thereby associating said event with time during execution of said computer program.

12. The register pressure apparatus as set forth in claim 8, further comprising: a compilation system that executes said computer program thereby improving compilation in said computer system by determining said maximum number of live registers in said computer system.

13. The register pressure apparatus as set forth in claim 8, further comprising: a simulator that executes said computer program thereby improving simulation in said computer system by determining said maximum number of live registers in said computer system.

14. A register pressure apparatus for determining the maximum number of live registers in a computer system, said computer system having an executing computer program having at least one instruction that accesses said registers, said apparatus comprising:

said instruction including a read instruction, and said live registers being associated with said read instruction;

at least two partitions in said computer program;

events in said computer program being associated with said instructions in a said partition, and thereby said accessed registers being associated with said events and said partition;

wherein, for each said event:

a number_of_live_registers variable associated with said event, and when said live registers are associated with said event said number_of_live_registers variable representing said associated live registers quantity;

a registers_with_known_information variable associated with said event and representing each said accessed register associated with said event as touched with respect to said event;

a partition variable associated with said event that represents said partition associated with said event;

each register pressure information variable associated with said event, said register pressure information variable including said number_of_live_registers variable associated with said event, said registers_with_known_information variable associated with said event, and said partition variable associated with said event, and said register pressure information variable associated with said event and said partition variable being recorded when said registers_with_known_information variable associated with said register pressure information variable corresponding to said event and said partition variable represents said registers that have not been previously touched;

said register pressure information variable corresponding to a previous said each event and said partition variable, being combined with said register pressure information variable corresponding to said event and said partition variable, when said registers_with_known_information variable associated with said register pressure information variable corresponding to said event and said partition variable represents a said register that has not been previously touched;

said register pressure information variable corresponding to said previous each event and said partition variable, being retained when said registers_with_known_information variable associated with said register pressure information variable corresponding to said event and said partition variable is equivalent to said registers_with_known_information variable associated with said register pressure information variable corresponding to said previous each event and said partition variable;

an uncertainty level variable that represents said registers associated with said event and said partition variable that have not been touched quantity, said uncertainty level variable being associated with said register pressure information variable corresponding to said event and said partition variable;

said register pressure information variable with a largest value of said number_of_live_registers variable associated with said event and said partition variable, being retained when said register pressure information variable is associated with: different values of said number_of_live_registers variables associated with said event and said partition variable, and equivalent values of said registers_with_known_information variables associated with said event and said partition variable; and one said register pressure information variable associated with said event and said partition variable, being retained when a plurality of said register pressure information variables is associated with said event and said partition variable, and said number_of_live_registers variables and said registers_with_known_information variables associated with said plurality of said register pressure information variables are equivalent; and a largest value of said number_of_live_registers variable associated with said events and said partition variable, in said computer program being identified and thereby said maximum number of live registers associated with said partition in said computer system being identified.

15. An article of manufacture comprising a program storage medium having computer readable program code embodied therein for determining the maximum number of live registers in a computer system, said computer system having an executing computer program having computer readable program code including at least one instruction that accesses said registers, said article of manufacture comprising:

computer readable code for including a read instruction in said instructions, and said live registers being associated with said read instruction;

computer readable program code for associating events in said computer program with said instructions, and thereby associating said accessed registers with said events;

wherein, for each said event:

computer readable program code for identifying when said event is associated with each said accessed register, determining when each said accessed register associated with said event is said live register, and representing said live registers associated with said event quantity by a number_of_live_registers variable associated with said event;

computer readable program code for identifying each said accessed register associated with said event as touched with respect to said event, and representing said touched registers associated with said event by a registers_with_known_information variable associated with said event;

computer readable program code for identifying each register pressure information variable associated with said event said register pressure information variable including said number_of_live_registers variable associated with said event and said registers_with_known_information variable associated with said event, and recording said register pressure information variable associated with said event when said registers_with_known_information variable associated with said register pressure information variable corresponding to said event represents said registers that have not been previously touched;

computer readable program code for combining said register pressure information variable corresponding to a previous said each event with said register pressure information variable corresponding to said event, when said registers_with_known_information variable associated with said register pressure information variable corresponding to said event represents a said register that has not been previously touched;

computer readable program code for retaining said register pressure information variable corresponding to said previous each event when said registers_with_known_information variable associated with said register pressure information variable corresponding to said event is equivalent to said registers_with_known_information variable associated with said register pressure information variable corresponding to said previous each event;

computer readable program code for associating said register pressure information variable corresponding to said event with an uncertainty level variable that represents said registers associated with said event that have not been touched quantity;

computer readable program code for retaining said register pressure information variable with a largest value of said number_of_live_registers variable associated with said event when said register pressure information variable is associated with: different values of said number_of_live_registers variables associated with said event and equivalent values of said registers_with_known_information variables associated with said event; and computer readable program code for retaining one said register pressure information variable associated with said event when a plurality of said register pressure information variables is associated with said event, and said number_of_live_registers variables and said registers_with_known_information variables associated with said plurality of said register pressure information variables are equivalent; and computer readable program code for determining a largest value of said number_of_live_registers variable associated with said events in said computer program and thereby identifying said maximum number of live registers in said computer system.

16. The article of manufacture as set forth in claim 15, further comprising:

computer readable program code for including a write instruction in said instructions, said registers accessed by said write instruction being dead registers and touched registers thereby identifying said touched registers as dead or live.

17. The article of manufacture as set forth in claim 15, further comprising:

computer readable program code for including a time interval variable in said register pressure information variable thereby associating said event with time during execution of said computer program.

18. An article of manufacture comprising a program storage medium having computer readable program code embodied therein for determining the maximum number of live registers in a computer system, said computer system having an executing computer program having computer readable program code including at least one instruction that accesses said registers, said article of manufacture comprising:

computer readable program code for including a read instruction in said instructions, and said live registers being associated with said read instruction;

computer readable program code for identifying at least two partitions in said computer program;

computer readable program code for associating events in said computer program with said instructions in a said partition, and thereby associating said accessed registers with said events and said partition;

wherein, for each said event:

computer readable program code for identifying when said event is associated with each said accessed register, determining when each said accessed register associated with said event is said live register, and representing said live registers associated with said event quantity by a number_of_live_registers variable associated with said event;

computer readable program code for identifying each said accessed register associated with said event as touched with respect to said event, and representing said touched registers associated with said event by a registers_with_known_information variable associated with said event;

computer readable program code for identifying said partition associated with said event and representing said partition by a partition variable associated with said event;

computer readable program code for identifying each register pressure information variable associated with said event, said register pressure information variable including said number_of_live_registers variable associated with said event, said registers_with_known_information variable associated with said event, and said partition variable associated with said event, and recording said register pressure information variable associated with said event and said partition variable when said registers_with_known_information variable associated with said register pressure information variable corresponding to said event and said partition variable represents said registers that have not been previously touched;

computer readable program code for combining said register pressure information variable corresponding to a previous said each event and said partition variable with said register pressure information variable corresponding to said event and said partition variable, when said registers_with_known_information variable associated with said register pressure information variable corresponding to said event and said partition variable represents a said register that has not been previously touched;

computer readable program code for retaining said register pressure information variable corresponding to said previous each event and said partition variable when said registers_with_known_information variable associated with said register pressure information variable corresponding to said event and said partition variable is equivalent to said registers_with_known_information variable associated with said register pressure information variable corresponding to said previous each event and said partition variable;

computer readable program code for associating said register pressure information variable corresponding to said event and said partition variable with an uncertainty level variable that represents said registers associated with said event and said partition variable that have not been touched quantity;

computer readable program code for retaining said register pressure information variable with a largest value of said number_of_live_registers variable associated with said event and said partition variable when said register pressure information variable is associated with: different values of said number_of_live_registers variables associated with said event and said partition variable, and equivalent values of said registers_with_known_information variables associated with said event and said partition variable; and computer readable program code for retaining one said register pressure information variable associated with said event and said partition variable when a plurality of said register pressure information variables is associated with said event and said partition variable, and said number_of_live_registers variables and said registers_with_known_information variables associated with said plurality of said register pressure information variables are equivalent; and computer readable program code for determining a largest value of said number_of_live_registers variable associated with said events and said partition variable in said computer program and thereby identifying said maximum number of live registers associated with said partition in said computer system.

19. A computer readable memory device encoded with a data structure having entries, for determining the maximum number of live registers in a computer system, said computer system having an executing computer program entry having at least one instruction entry that accesses said registers, said memory device comprising:

said instruction entry including a read instruction entry, and said live registers being associated with said read instruction entry;

event entries in said computer program entry being associated with said instruction entries, and thereby said accessed registers being associated with said event entries;

wherein, for each said event entry:
a number_of_live_registers variable entry associated with said event entry, and when said live registers are associated with said event entry said number_of_live_registers variable entry representing said associated live registers quantity;

a registers_with_known_information variable entry associated with said event entry and representing each said accessed register associated with said event entry as touched with respect to said event entry;

each register pressure information variable entry associated with said event entry, said register pressure information variable entry including said number_of_live_registers variable entry associated with said event entry and said registers_with_known_information variable entry associated with said event entry, and said register pressure information variable entry associated with said event entry being recorded when said registers_with_known_information variable entry associated with said register pressure information variable entry corresponding to said event entry represents said registers that have not been previously touched;

said register pressure information variable entry corresponding to a previous said each event entry being combined with said register pressure information variable entry corresponding to said event entry, when said registers_with_known_information variable entry associated with said register pressure information variable entry corresponding to said event entry represents a said register that has not been previously touched;

said register pressure information variable entry corresponding to said previous each event entry being retained when said registers_with_known_information variable entry associated with said register pressure information variable entry corresponding to said event entry is equivalent to said registers_with_known_information variable entry associated with said register pressure information variable entry corresponding to said previous each event entry;

an uncertainty level variable entry that represents said registers associated with said event entry that have not been touched quantity, said uncertainty level variable entry being associated with said register pressure information variable entry corresponding to said event entry;

said register pressure information variable entry with a largest value of said number_of_live_registers variable entry associated with said event entry being retained when said register pressure information variable entry is associated with: different values of said number_of_live_registers variable entries associated with said event entry and equivalent values of said registers_with_known_information variable entries associated with said event entry; and one said register pressure information variable entry associated with said event entry being retained when a plurality of said register pressure information variable entries is associated with said event entry, and said number_of_live_registers variable entries and said registers_with_known_information variable entries associated with said plurality of said register pressure information variable entries are equivalent; and a largest value of said number_of_live_registers variable entry associated with said event entries in said computer program being identified and thereby said maximum number of live registers in said computer system being identified.

20. The computer readable memory device as set forth in claim 19, further comprising: said register pressure information variable entry including a time interval variable entry and thereby associating said event entry with time during execution of said computer program entry.

* * * * *